(12) United States Patent
Treynor et al.

(10) Patent No.: US 12,201,492 B2
(45) Date of Patent: Jan. 21, 2025

(54) METHODS AND SYSTEMS ASSOCIATED WITH A DATA INPUT PLATFORM AND DIFFERENTIAL GRAPH REPRESENTATIONS

(71) Applicant: R2DIO, Inc., Berkeley, CA (US)

(72) Inventors: Thomas Pirrie Treynor, Berkeley, CA (US); Li-Yun Arthur Kung, Arlington, MA (US)

(73) Assignee: R2DIO, Inc., Berkeley, CA (US)

( * ) Notice: Subject to any disclaimer, the term of this patent is extended or adjusted under 35 U.S.C. 154(b) by 0 days.

(21) Appl. No.: 18/029,041

(22) PCT Filed: Sep. 30, 2021

(86) PCT No.: PCT/US2021/053041
§ 371 (c)(1),
(2) Date: Mar. 28, 2023

(87) PCT Pub. No.: WO2022/076246
PCT Pub. Date: Apr. 14, 2022

(65) Prior Publication Data
US 2023/0367794 A1 Nov. 16, 2023

Related U.S. Application Data

(60) Provisional application No. 63/087,699, filed on Oct. 5, 2020.

(51) Int. Cl.
*A61C 17/10* (2006.01)
*G06F 16/2457* (2019.01)
*G06F 16/28* (2019.01)

(52) U.S. Cl.
CPC ........ *A61C 17/10* (2019.05); *G06F 16/24573* (2019.01); *G06F 16/287* (2019.01); *G06F 16/288* (2019.01)

(58) Field of Classification Search
CPC . A61C 17/10; G06F 16/24573; G06F 16/287; G06F 16/288
See application file for complete search history.

(56) References Cited

U.S. PATENT DOCUMENTS

| | | | |
|---|---|---|---|
| 2002/0087275 A1* | 7/2002 | Kim | G16B 45/00 702/19 |
| 2011/0137632 A1* | 6/2011 | Paxson | G16B 5/30 703/11 |

(Continued)

OTHER PUBLICATIONS

International Search Report and Written Opinion in corresponding International Patent App. No. PCT/US2021/053041, mailed Feb. 28, 2022, in 14 pages.

*Primary Examiner* — Mark D Featherstone
*Assistant Examiner* — Kweku William Halm
(74) *Attorney, Agent, or Firm* — Procopio, Cory, Hargreaves & Savitch LLP

(57) ABSTRACT

A method of processing data comprises receiving, at a processor, first data comprising a plurality of values; receiving second data comprising one or more directives and association information; retrieving a first set of records from the first data using a first subset of the second data; generating a second set of records from the second data using a second subset of the second data; generating, based on a third subset of the second data, a plurality of records associations, the plurality of records associations including one or more of: first relationships between records of the first set of records, second relationships between records of the second set of records, and third relationships between records of the first set of records and the second set of records; storing the plurality of records associations in a structured format; and generating feedback data based on the plurality of records associations.

36 Claims, 25 Drawing Sheets

(56) References Cited

U.S. PATENT DOCUMENTS

2011/0153667 A1\* 6/2011 Parmenter ........... G06F 16/2365
707/E17.014
2017/0270245 A1\* 9/2017 van Rooyen .......... G16B 50/40
2020/0133224 A1 4/2020 Popp \* cited by examiner a) Data submission a) First submission b) Summary Block Flow Diagram a) Primary graph c) Summary Block Flow Diagram d) Summary Block Flow Diagram c) Summary Block Flow Diagram a) Primary graph c) Graph transform b) Summary Block Flow Diagram a) Individual nodes and edges b) Summary nodes and edges c) Summary nodes and edges (alternate)

a) Primary graph b) Summary BFD a) Primary graph b) Summary BFD

METHODS AND SYSTEMS ASSOCIATED WITH A DATA INPUT PLATFORM AND DIFFERENTIAL GRAPH REPRESENTATIONS

CROSS-REFERENCE TO RELATED APPLICATIONS

This Application is a U.S. National Stage entry of PCT Application No.: PCT/US2021/053041, filed Sep. 30, 2021, which claims priority to U.S. Provisional Application No. 63/087,699, filed on Oct. 5, 2020, the contents of which is incorporated here by reference in its entirety.

BACKGROUND

1. Technical Field

Aspects of the example implementations relate to methods and systems associated with a data input platform that may reduce barriers for capture of data, and summary block flow diagrams.

2. Related Art

Related art software products are available for the capture of data in industrial research, development, and manufacturing environments. These related art products are sold under the monikers of Laboratory Information Management Systems (LIMS) or Manufacturing Execution Systems (MES). The main goal of these related art systems is to track the workflows (e.g., experiments or manufacturing runs), and the data that is created by those workflows, including data related to the materials created or consumed by the experiment or manufacturing processes. While additional goals for these related art systems include sample tracking or laboratory notebook capabilities, the primary goal is to track the work accomplished in the laboratory or manufacturing floor.

These related systems provide a data input interface centered on a single workflow and the steps within the single workflow. More modem related art systems allow end users to define custom workflows by building the workflows from individual building blocks corresponding to steps, while older related art software may require manual operation by a software engineer, application specialist, or other privileged user to set up the related art workflow steps.

Each related art workflow step may include parameters that are recorded. For example, the identifier ID of an instrument used for a process, or the ambient temperature of the lab may be of interest. In the related art, certain parameters may be marked as required, so as to reduce the chance of users entering data forgetting to record required information. While older related art LIMS systems may have built-in modules that restrict the kinds of parameters allowed in any kind of workflow step, more modem related art systems allow for user-based definitions of associated parameters (e.g., "custom" fields).

In addition, the specification or expectation for the type of data to be recorded in the step is required in the related art. These may be resultant measurements on the variety of samples or materials that are transformed through the workflow step process. Once these related art workflow step templates are defined, users may use the system for input by stepping through the workflows as they are run in the lab or in manufacturing.

As data is sent in to a workflow step, the related art LIMS or MES system validates the data. For example, the related art LIMS or MES system may check that required parameters have been input. The related art LIMS or MES system may also check if the input data is complete, for example, if the number of data rows or values corresponds to an expected number based on the number of samples or materials designated as inputs into the step. In this way, the related art systems prevent malformed or incomplete data from entering the system, with a focus on protecting the integrity of the data over the ease of data input.

Because of the built-in or user-defined workflows in the related art, the input data is handled such that it is relatively easy to store the data in structured format, in a structured query language (SQL)-compatible database for efficient storage. Such related structured data approaches may make both the display of the data and later analysis of the data relatively easy if the user can query and export the structured data. Some related art systems acquire the flexibility for storing custom data by using more flexible storage, such as key-value ("no-SQL") databases, but those related art systems come at a cost of making it harder for users to retrieve data.

Related art approaches to structuring data for storage and retrieval place a heavy constraint on the input of the data. Related art systems handle the data input by creating workflows where at each step, the type of data is defined along with the validation constraints required for the data of that step. Data input can then be handled by querying users for the primary data values, and then ensuring the values are validated appropriately before accepting them into the system. This means that related art systems only create records for values which exist in the primary data input at the step, and records of associations amongst those created records. Because of the pre-defined workflow, there may be associations of some of those records with the immediately preceding or following records as well.

However, the related art focus on workflow steps means that the entry of the input data is often limited in scope to that workflow step. Additional relationships are not allowed or are limited to certain relationships that must be explicitly defined. For example, while the operator of the workflow step may be captured, the operator may be assumed to be the logged-in user. Thus, it may be difficult for someone else who is not the operator to define the operator of the step. Similarly, if the workflow step is pre-defined, it means that all the input samples are of a pre-defined type. It is difficult to allow for samples of various types to go through the same workflow step. Many of these related art inflexibility points derive from the workflow step centric model.

Similarly, the related art actual data entry is constrained in scope to a single workflow step. In many related art systems there is required synchronicity of the user doing the workflow step work as well as entering data into the system. For example, the interface to enter the input data may not let the user proceed until, for example, the right number of data values, or a validated parameter value, are entered into the interface. By completing the interface, the data is written into the system, and the user is allowed to proceed to the following workflow step. For some fast workflow steps, the overhead to data entry becomes a significant portion of the time, thus slowing down the overall pace of the work. In related art situations where an operator wants to run multiple workflow steps or the same step of multiple similar workflows in parallel, it may be impossible to enter the data while simultaneously doing the work. The operator may require workarounds such as temporarily recording the data with a separate method, or having to toggle through multiple interfaces at a time at the cost of increased chance of data entry error.

In a research and development environment, workflow definitions change quickly relative to the time scale for updating software systems, to accommodate the changes in tracking those workflows or validating the primary data for input. There may be very few repeat runs using the same workflow template. The experimental processes and parameters often change at a rate that makes it cost-prohibitive (in both time and money) to structure the records in a fixed manner or to make structured interfaces for each kind of experiment.

In the related art system, the user (e.g., end user if allowed; otherwise, some sort of user with access privileges) must make a new workflow for each change which changes any steps, especially when those changes add steps or remove steps. Sometimes, a workflow template may be copied and edited to reduce the time spent adjusting the template, but it slows down the process of running the actual workflows. In addition, over time, the number of versions of some basic workflows may increase to a bothersome level, where it becomes difficult to find the appropriate version, or that maintenance of workflow and workflow step versions becomes another cost that must be paid, in the related art system.

Editing and updating data is another constrained facet of related art LIMS systems. The related art interfaces for editing data are not the same as the entry interfaces. In related art systems, records from a particular workflow step may be found and those records may be updated. Perhaps there are methods to change multiple values of multiple selected records at a time, but the edits are still usually constrained to one workflow step at a time, and potentially require the user to click through multiple steps and update data at each one where a mistake has been propagated throughout the whole workflow.

In addition, when there are primary data validation errors, related art systems block the writing of records (created or updated) at the workflow step until all errors are fixed. The reasoning is to prevent badly formatted data from entering the system, however, at a cost of preventing the entry of the vast majority of correctly formatted data in most instances.

With respect to related art tools are available to view the work done in the lab or manufacturing floor, because of the related art workflow-centric representation in existing systems, the views are limited to one workflow. For example, it may be possible to view the steps of a workflow in a graph, and it may be possible to view all the samples within a workflow. However, the related art associations which would naturally make a graph of the workflow are between the step definitions. In contrast, there are generally no inter-workflow graph definitions inherent in the related art system.

It may be possible to obtain inter-workflow relationships by zooming in on one particular sample. In such a case, it would be possible to see all the workflows that a sample participated in, and to order them by date. However, this capability does not provide a complete picture of all the samples in each of the workflows. In addition, if the workflow sample tracking is set up to define a new set of output samples instead of the original input samples, it may not be possible to produce or provide inter-workflow information. A separate lineage tracking mechanism must be present within the related art system. In any case, a visualization of multiple samples participating in multiple workflows is generally not available to the end user.

Because the related art graph visualization across workflows is not a primary objective, there are no tools geared toward the inspection and comparison of such inter-workflow graphs. With respect to related art tools to compare inter-workflow graphs, even if the visualization of samples through all their workflows can be achieved, there are often hundreds to thousands of samples per workflow in research and development experiments or manufacturing workflows. The numbers of nodes and edges would be very difficult to interpret without some kind of compression of the information into a simplified graph representation of the ensemble state.

An algorithm would be required to generate this simplified graph representation of the ensemble state. The related art does not provide an algorithm for solving this particular problem. The closest related art approaches are not applicable to graph data, but are in the computer science and biotechnology communities.

The related art Shortest Common Supersequence (SCS) Problem is the problem of finding the shortest sequence (the "supersequence") where each member of a set of input sequences can be found as a subsequence of the supersequence (with gaps). For example, given a set {"ABC", "ACE", "FACE" }, the shortest common supersequence is "FABCE" (length 5). The time it takes to calculate exact solutions to the SCS Problem increases exponentially with larger numbers of longer sequences, rendering them impractical except for very simple cases. Fortunately, there are many heuristics and approximation algorithms for solving the SCS Problem, but it is nevertheless difficult to achieve desired performance with a single algorithm for all kinds of use cases. Thus, the related art SCS Problem approaches do not provide a solution for the above-disclosed problems with respect to the related art systems.

Biologists have become familiar with the related art problem of sequence alignment for DNA, RNA and proteins. In view of the related art high-throughput sequencing instruments capable of generating very large sets of DNA sequences, bioinformaticists continue to develop ever-more efficient tools for sequence alignment[4]. These related art algorithms map DNA sequence "reads" generated by these instruments against a "reference" (e.g., a genome sequence) to find the best match location of the read sequence against the reference. For example, with a "read" sequence "ABE" and a reference "XYZFABCEXYZ", the best location for the read sequence starts at the 5th position of the reference ("A") and ends at the eighth position ("E"), where three of the four reference bases line up to the read sequence.

However, similar to the SCS problem, the related art exact solutions for sequence alignment are possible in exponential time with dynamic programming methods, but the related art algorithms can only generate approximate solutions to reduce the computation time. Thus, the related art sequence alignment approaches do not provide a solution for the above-disclosed problems with respect to the related art systems.

Visualization of graph data, once generated, is readily available, with many code libraries that will generate visualizations from properly formatted graph information. Generally, these libraries will not only distribute and connect the nodes in a diagram, but they can also label each node with one or more dimensions of the record it represents. They can also accommodate a variety of cases such as when a node is a child of both its direct parent node and other ancestor nodes, or when a provided set of parent-child relationships would generate two or more completely disconnected graphs.

As noted above with respect to the related art, there is an unmet need in the related art for a software platform which reduces the friction in capturing and structuring data, such as in manufacturing and R&D realms. While potential benefits of such a platform can be so great that users are willing to constrain their ways of working and accept an impact to the rate of work, the goal is to drive down the costs such that the rate of work approaches its natural limit.

One of the reasons for related art difficulty in implementing these platforms is the constant tension between being able to capture changing data and yet structuring that data, so that retrieval and analysis may be streamlined. Related art LIMS systems use pre-defined workflows to manage this tension, where users are able to define the structure of the data and the sequence of steps for their work. Adjustments to the workflow can be made whenever there are changes to the parameters to capture or the format of the data values. However, the related art usage of pre-defined workflows has a number of drawbacks.

The costs of related art pre-determined workflows are particularly acute in earlier stages of the industrial product life cycle—research and development. In these earlier stages, workflows and the steps within them are still in flux and often change quickly relative to the time scale for updating software systems to accommodate the changes in tracking those workflows or validating the primary data for input. The experimental processes and parameters often change at a rate that makes it cost-prohibitive (in both time and money) to structure the records in a fixed manner or to make structured interfaces for each kind of experiment. Constant adjustments to workflow steps means the cost of configuring the platform can be a significant portion of the cost of running the workflow.

The related art pre-defined workflows and workflow steps constrain the scope of the data that can be written and the associations of the data that can be written. Many related systems allow for the creation of one record of one type, as well as many records of one type. There may even be associated attributes or records, which would require pre-defining how the data is processed. For example, in handling an input data table, the many values of each row may correspond to a record and its related attributes (e.g. a series of materials with their associated types, users, and processes). However, related systems may have disadvantages, in many use cases, for example: (1) the data in each row or column is no longer in the same order, (2) the association to be made is in a different data table, (3) there are slightly different associations/columns to be recorded for different rows, or (4) some values are missing.

In the related art, editing data is similarly constrained. The related art interface for updating entries is not the same as the interface for entering data. So, even in the case where batch editing of records is supported, the user must use a different format for making changes to data already in the system instead of a more convenient alternative, such as the original input data table, which could be edited easily with updated values.

Related art data entry platforms may try to ensure that all entered data is validated and error-free. Stepping through workflows synchronously and entering parameters and data values which are validated by the system can prevent malformed data from entering the system. However, this related art approach also prevents the entry of a vast majority of error-free parameters and data. Moreover, the constraints of such a related art system introduce a burden on the performance of the work at all times, including the large majority of the work when no errors are present.

Related art graphs to visualize data provide a mechanism to understand workflows such as those used in industrial research or manufacturing. When these workflows can be represented as states and transformations, as discussed above, graph information may be generated which can be displayed for the user.

In related art systems, all the nodes and edges are displayed, and it may be possible to zoom in/out to look at areas of interest. However, such graphs may quickly become very difficult for a user to interpret in all but the simplest cases. For example, many industrial processes process large numbers of samples, which will render the graph into hundreds or thousands of nodes.

Understanding the connections of the work between different workflows is also a difficult problem to solve in the related. The path through a single workflow is the natural core visualization that is permitted, but there are no connections between workflows. Individual samples may be linked so that the history may be reconstructed. However, it becomes very difficult to reconstruct the history across many samples across different workflows for comparison.

Any information that is similar across large groups of nodes or edges must generally be deduced from inspection of individual node or edge information. However, such information is generally the most valuable information in an industrial research and development setting. The visualization of the workflows can be used to look at the trends and differences between groups of workflows (e.g., experiments) to determine which set of (e.g., small) variations in the workflows have the highest impact on experimental or manufacturing outcomes.

Thus, there is an unmet need in the related art for an algorithm which could take, as input, graph data describing a set of primary nodes and edges, as well as parameters of interest for each node or edge, and produce a set of "compressed" graph data representing the original graph as one with fewer nodes and edges—sometimes hundreds or thousands fewer nodes and edges—which would be highly valuable in making the information contained in the primary graphs more interpretable.

SUMMARY

This disclosure describes a software system, termed a data input platform, which seeks to reduce the barrier to entry for capturing and structuring data. The system is distinguished by an accumulation of attributes, each of which is unusual for systems that aim primarily to capture and structure data. As described below, key features of this system are ease of batch data entry and updates, entry of incomplete data and data with errors, and flexible creation of associations between any data in the system.

One major attribute that differentiates the system is to remove elements of the related art definitions of "workflow" prescription from the system. Instead, the input data submitted to the system includes a parallel set of instructions for processing the input data. Second, elements of the description of what data and what types of data to capture from the input data are also no longer prescribed in the system, but included within those parallel instructions. Third, in some example implementations, the system is designed to be very permissive, such that the input of data to the system is prioritized over the validation or constraints of disallowing data. Fourth, in some example implementations, the system is designed such that the records created by the system may be represented as a graph, enabling the "workflow" to emerge from the system instead of being dependent on a previous description from the user. The result is a system with much reduced friction to data entry, which speeds up industrial research, development, and production.

This disclosure also describes a specific kind of graph representation, termed a summary block flow diagram (BFD), which may be constructed by algorithms to represent input graph data. Considering the values of parameters associated with the nodes or edges of the input graph data, a summary BFD is a graph where each node, termed a block, and each edge may represent many nodes and many edges of the input graph. If there are many parameters associated with the input graph data, many summary BFDs may be generated to highlight the effects of various combinations of parameters. Each summary BFD conserves the accounting of blocks and edges so that it remains an accurate depiction of the input graph information. Each summary BFD can be visualized just like the input graph, except the compression of information makes the summary BFD much easier to interpret, especially when the input graph consists of hundreds or thousands of nodes. The result is a tool which allows for understandable visualizations of input graphs and the effects of the associated parameters on the graphs.

According to an aspect, a method of processing data includes receiving, at a processor, first data comprising a plurality of values; receiving second data comprising one or more directives and association information; retrieving a first set of records from the first data using a first subset of the second data; generating a second set of records from the second data using a second subset of the second data; generating, based on a third subset of the second data, a plurality of records associations, the plurality of records associations including one or more of: first relationships between records of the first set of records, second relationships between records of the second set of records, and third relationships between records of the first set of records and the second set of records; storing the plurality of records associations in a structured format; and generating feedback data based on the plurality of records associations.

According to another aspect, the method further includes generating a third set of records by editing records of the first set of records using a fourth subset of the second data; and editing one or more records associations of the plurality of records associations including the first relationships, the second relationships, the third relationships and fourth relationships between records of the first set of records, the second set of records, and the third set of records. The method further includes annotating a subset of the first data associated with the second set of records and the third set of records. The method still further includes annotating a subset of the first data associated with one or more of the first relationships, the second relationships, the third relationships, and the fourth relationships.

According to yet another aspect, the method includes receiving third data comprising a second plurality of values; and applying the second data to the third data.

According to still another aspect, the method includes generating a template comprising a representation of the second data; and applying the template to a plurality of input data.

According to a further aspect, the plurality of values of the first data include one or more of: first values corresponding to physical materials, second values corresponding to processes which take the physical materials as inputs or create the physical materials as outputs, and third values corresponding to types of the physical materials, the processes, or measurements associated with at least one of the first values and the second values.

According to a still further aspect, generating the plurality of records associations further includes: identifying first errors between the records of the first set of records, identifying second errors between the records of the second set of records, and identifying third errors between the records of the first set of records and the second set of records.

According to another aspect, the method further includes presenting, via a user interface, a feedback document based on one or more of the plurality of records associations and errors associated with generating the plurality of records associations.

According to another aspect, the method further includes generating a summary block flow diagram based at least in part on the plurality of records associations, wherein generating the summary block flow diagram comprises: identifying primary objects associated with the first data; determining graphical associations between the primary objects; and generating, based on the primary objects and the graphical associations, blocks data, wherein the blocks data represents one or more block objects based on common characteristics of one or more primary objects. Additionally, via a user interface, a graph is displayed based in part on the primary objects, the graphical associations, and the blocks data. Further, the primary objects represent one or more of physical materials and processes that are used to at least one of process input materials and create output materials. Also, via a user interface, a graph is displayed based in part on the primary objects, the graphical associations, and the blocks data.

According to another aspect, the blocks data comprises a directed graph, wherein an association between a first primary object and a second primary object form an ordered pair. Further, via a user interface, a graph is displayed based in part on the primary objects, the graphical associations, and the blocks data.

According to another aspect, an association between physical materials and processes form a bipartite graph, wherein edges of the bipartite graph include a set of edges comprising associations between a first set of primary objects types to a second set of primary objects types, without overlap between the first set of primary objects types and the second set of primary objects types. Also, via a user interface, a graph is displayed based in part on the primary objects, the graphical associations, and the blocks data.

According to another aspect, associations between a first set of primary object types and a second set of primary object types form a bipartite graph, wherein edges of the bipartite graph include a set of edges comprising associations between a first set of primary object types and a second set of primary objects types, without overlap between the first set of primary objects types and the second set of primary objects types. Further, via a user interface, a graph is displayed based in part on the primary objects, the graphical associations, and the blocks data.

According to another aspect, associations between a first set of primary object types and a second set of primary object types form a directed bipartite graph, wherein edges of the directed bipartite graph include a set of edges comprising one or more of: first type-to-second type associations, wherein an instance of the first type of primary object is designated an input to an instance of the second type of primary object, second type-to-first type associations, wherein the first type of primary object is designated an output of an instance of the second type of primary object, first type-to-first type associations, wherein a first instance of the first type of primary object is designated an input to a first instance of the second type of primary object and a second instance of the first type of primary object is designated an output of the first instance of the second type of primary object, and second type-to-second type associations, wherein a first instance of the second type of primary object is designated an input to a first instance of the first type of primary object and a second instance of the second type of primary object is designated an output of the first instance of the first type of primary object. Also, via a user interface, a graph is displayed based in part on the primary objects, the graphical associations, and the blocks data.

According to another aspect, an association between physical materials and processes form a directed bipartite graph, wherein edges of the directed bipartite graph include a set of edges comprising one or more of: material-to-process associations, wherein a physical material is designated an input material to a child process, process-to-material associations, wherein the physical material is designated an output material of a parent process, material-to-material associations, wherein a first physical material is designated the input material to a first process and a second physical material is designated the output material of the first process, and process-to-process associations, wherein the first process is designated the parent process to the physical material and a second process is designated the child process to the physical material. Further, via a user interface, a graph is displayed based in part on the primary objects, the graphical associations, and the blocks data.

The example implementations may also include a computer-readable medium storing computer executable code that, when executed, causes a processor to perform the foregoing elements.

According to another aspect, a method of processing data comprises generating a summary block flow diagram based at least in part on a plurality of records associations, wherein generating the summary block flow diagram comprises: identifying primary objects associated with first data including a plurality of values; determining graphical associations between the primary objects; and generating, based on the primary objects and the graphical associations, blocks data, wherein the blocks data represents one or more block objects based on common characteristics of one or more primary objects. Also, via a user interface, a graph is displayed based in part on the primary objects, the graphical associations, and the blocks data. Further, the primary objects represent one or more of physical materials and processes that are used to at least one of process input materials and create output materials. Additionally, a graph is displayed based in part on the primary objects, the graphical associations, and the blocks data. Still further, the blocks data comprises a directed graph, wherein an association between a first primary object and a second primary object form an ordered pair. Yet further, via a user interface, a graph is displayed based in part on the primary objects, the graphical associations, and the blocks data.

According to another aspect, an association between physical materials and processes form a bipartite graph, wherein edges of the bipartite graph include a set of edges comprising associations between a first set of primary objects types to a second set of primary objects types, without overlap between the first set of primary objects types and the second set of primary objects types. Further, via a user interface, a graph is displayed based in part on the primary objects, the graphical associations, and the blocks data.

According to another aspect, associations between a first set of primary object types and a second set of primary object types form a bipartite graph, wherein edges of the bipartite graph include a set of edges comprising associations between a first set of primary objects types and a second set of primary objects types, without overlap between the first set of primary objects types and the second set of primary objects types. Further, via a user interface, a graph is displayed based in part on the primary objects, the graphical associations, and the blocks data.

According to another aspect, associations between a first set of primary object types and a second set of primary object types form a directed bipartite graph, wherein edges of the directed bipartite graph include a set of edges comprising one or more of: first type-to-second type associations, wherein an instance of the first type of primary object is designated an input to an instance of the second type of primary object, second type-to-first type associations, wherein the first type of primary object is designated an output of an instance of the second type of primary object, first type-to-first type associations, wherein a first instance of the first type of primary object is designated an input to a first instance of the second type of primary object and a second instance of the first type of primary object is designated an output of the first instance of the second type of primary object, and second type-to-second type associations, wherein a first instance of the second type of primary object is designated an input to a first instance of the first type of primary object and a second instance of the second type of primary object is designated an output of the first instance of the first type of primary object. Further, via a user interface, a graph is displayed based in part on the primary objects, the graphical associations, and the blocks data.

According to another aspect, an association between physical materials and processes form a directed bipartite graph, wherein edges of the directed bipartite graph include a set of edges comprising one or more of: material-to-process associations, wherein a physical material is designated an input material to a child process, process-to-material associations, wherein the physical material is designated an output material of a parent process, material-to-material associations, wherein a first physical material is designated the input material to a first process and a second physical material is designated the output material of the first process, and process-to-process associations, wherein the first process is designated the parent process to the physical material and a second process is designated the child process to the physical material. Further, via a user interface, a graph is displayed based in part on the primary objects, the graphical associations, and the blocks data.

DETAILED DESCRIPTION

Figure 1:
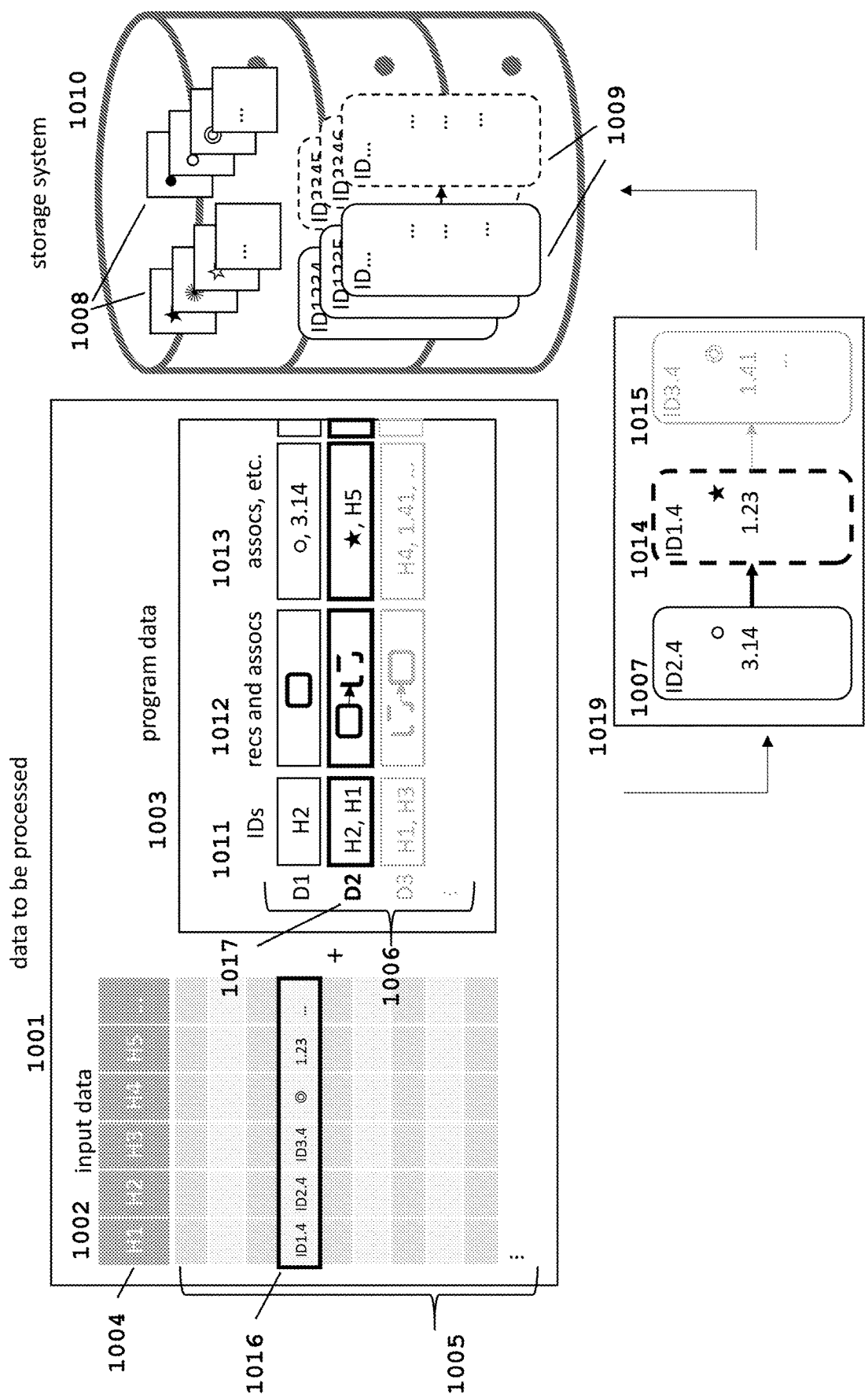
FIG. 1 illustrates the handling of input data in an example implementation of the data input platform, according to an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application. Further, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present application.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," and/or any variant thereof, means any connection or coupling, either direct or indirect, between two or more elements; the coupling and/or connection between the elements can be physical, logical, and/or a combination thereof. Additionally, the words "herein," "above," "below," and words of similar import, when used in this application, shall refer to this application as a whole and not to any particular portions of this application. Where the context permits, words in the above description using the singular or plural number may also include the plural or singular number respectively.

The following discussion provide a brief, general description of a suitable environment in which such a software system (platform) can be implemented. Although not required, aspects of the platform are described in the general context of computer-executable instructions, such as routines executed by a general-purpose computer, a personal computer, a server, and/or other computing system. The platform can also be embodied in a special purpose computer or data processor that is specifically programmed, configured, and/or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), field programmable gate arrays (FPGAs) or the like, and/or any suitable combination of such devices. Computer-executable instructions may be stored in memory, such as random access memory (RAM), read-only memory (ROM), flash memory, or the like, and/or any suitable combination of such components. Computer-executable instructions may also be stored in one or more storage devices, such as magnetic or optical-based disks, flash memory devices, and/or any other suitable type of non-volatile storage medium or non-transitory medium for data. Computer executable instructions may include one or more program modules, which can include routines, programs, objects, components, data structures, and so on that perform particular tasks and/or implement particular abstract data types. Information handled by these computing systems can be presented at any suitable display medium, including a CRT display or LCD.

Aspects of the platform can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the platform described herein may be stored or distributed on tangible, non-transitory computer-readable media, including magnetic and optically readable and removable computer discs, stored in firmware in chips (e.g., EEPROM chips). Alternatively, aspects of the platform may be distributed electronically over the Internet or over other networks (including wireless networks). That is, aspects of the platform can be executed by computing systems within an individual laboratory, by computing systems located at a datacenter, or in combinations of the two. Those skilled in the relevant art will recognize that portions of the system may reside on a server computer, while corresponding portions reside on a client computer. Data structures and transmission of data particular to aspects of the system are also encompassed within the scope of the system.

Example implementations described herein relate to a computer-implemented system that may reduce the related art barrier to entry for capturing and structuring data. This computer-implemented system is referred to as a "data input platform". While the following disclosure relates to applications of the data input platform to industrial research and development and manufacturing, the present example implementations are not limited thereto. The example implementation may be distinguished from the related art approaches by an accumulation of attributes, each of which, as described below, is unusual for systems that aim primarily to capture and structure data. As described below, key features of the example implementations include ease of batch data entry and updates, entry of incomplete data and data with errors, and flexible creation of associations between any data in the system. The system according to the example implementations has much reduced friction to data entry, and speeds up industrial research, development, and production.

Several major attributes that have the most significant influence on the data input platform according to the example implementations are disclosed herein. A first attribute that differentiates the example implementation system is that it may remove elements of the related art definitions of "workflow" prescription. Instead, according to the example implementations, the input data submitted to the system includes a parallel set of instructions for processing the input data. According to a second attribute, elements of the description of the data and the types of data to capture from the input data are also no longer prescribed in the system, but are instead included within those parallel instructions. According to a third attribute, some example implementations of the system may be very permissive, such that the input of data to the system is prioritized over the validation or constraints of disallowing data. According to a fourth attribute, in some example implementations, the records created by the example implementation system may be represented as a graph, enabling the "workflow" to emerge from the system, instead of being dependent on a previous description from the user. As described in more detail below, these attributes may combine to have a profound impact on the resulting data input platform's characteristics compared to related art systems.

The example implementations are directed to a software system which streamlines batch data entry. A first attribute is to remove the related art model which requires previous description on behalf of the user of workflow steps and data validation constraints for the data input. This is accomplished by requiring a set of executable and computer-readable instructions that describe how to capture the data for any input data that is to be captured. The set of instructions may be referred to as a "program" and a particular instruction may be referred to as a "directive".

By allowing for the logic of the data processing to be associated with the input data as a computer-implemented method including instructions stored in a non-transitory computer readable medium (e.g., program) comprised of one or more directives, a much more flexible and powerful data processing system may be provided, which solves many of the use cases where related art input systems struggle, as discussed below. In other related art systems, the logic for the data processing is associated with the platform doing the processing, as opposed to the incoming data, greatly limiting the flexibility for processing.

A key aspect of the example implementations is the ability to make many record associations of various types in one flexible platform. A second key aspect of the software system is to provide for the capture of all manner of data, not just the simple input data included (e.g., the system may capture data which is not present in the input data at all, such as for example, an association between two existing records in the system which are not referred to in the input data). This example implementation deviates from related art systems which focus on recording the basic data of the values directly submitted. The data input platform allows not just the capture of the direct input values submitted, but also associations of those values to each other, associations to records within the system, or any combination thereof.

In some example implementations, the platform provides for batch editing. Related art systems do not allow for edits in the same mechanism as data input. In the related art, a separate interface is needed, which requires specifying which records need to be edited and in what manner. In some example implementations, the user may process the exact same input data with the changes made inline—records with no changes will be ignored and records with changes will have only the changed items affected. This approach maximizes the number of records that may be edited while minimizing the amount of effort required to effect those changes.

The permissiveness of some example implementations of the platform is another notable attribute. In related art systems, submitting data files that are largely or even partially congruent with previously submitted data files often results in duplication of data, errors, or both, halting the input. In some example implementations, the platform is designed to prevent creating records which already exist in the system. This allows the user to submit partial and incomplete data sets without worry. For example, an experiment may be designed to create 20 materials over time, but a user may upload the data corresponding to the 6 new ones made at one point in time. Later, the user can append 3 more materials created at that later time and re-submit the augmented data file, knowing only the 3 new records would be added. The experiment may be handed off to another user to finish making the materials, and that user would be able to upload all of the data without worry about duplications or errors.

A fourth attribute, in some example implementations, is to model certain records and their associations such that they can be used to represent the data system as a graph. A general way to represent many systems is to have one record type to represent the status or state (of the system or some object in the system) and one record type to represent transformations of that state or status. These records (or other secondary records) may be used to document their associations, such as the outcome of a transform resulting in a particular state. Other record types may be used as secondary tags or decorations of these graph records.

In the example implementations, states and transformations can be represented as graph nodes and graph edges, respectively, or vice versa. The transformations are often directional, meaning that an edge representing a transformation is an ordered pair of states, which results in a directed graph. Another alternative, referred to as a bipartite graph, may represent both states and transformations as graph nodes and for graph edges to represent the associations between nodes.

In some R&D disciplines, the graph records may represent materials (states) and processes (transformations). The relationship between a material which is used in a process (an "input material" for a "child process"), or a material which is part of the outcome of a process (an "output material" for a "parent process") may be documented with the proper associations. In such a way, the pre-defined workflows of other systems are no longer required. Each association of materials transformed via processes to other materials builds up the representation of the work, such that a series of the material transformations defines the workflow which was used. The natural graph that emerges from this abstraction is a directed bipartite graph.

Each of these material or process records may be associated with secondary tag records. For example, the tag records could represent indirect parameters associated, such as the material type, the operator of the process, or the instrument used in the process. The graph elements (for example, materials and processes) may then each have combinations of values representing their secondary parameters.

The example implementations relate to a summary Block Flow Diagram (BFD), distinguished from the primary node/edge diagram of the related art. Using as input the various parameters of nodes or edges, an algorithm (with an example below) may be used to form groups of nodes and groups of edges. Each "block" is then a representation of a group of primary nodes, and each "edge" of a summary BFD represents a group of primary edges. The summary BFD can be visualized in a manner that, due to the compression of information, makes the summary BFD much easier to interpret as compared with the related art approaches.

An algorithm is required to generate such summary BFDs. Each of the nodes in the primary graph has a set of parameters associated with it and parameter values which are shared across multiple nodes may be used to group those nodes into blocks. A chosen algorithm, using the shared parameters and a description of which parameters/dimensions should be used to separate (show the difference of) blocks, generates appropriate block and edge information that accurately represents the primary graph. The criteria for distinguishing a summary BFD from other possible representations of the primary graph are discussed in the example implementations below.

Representative example implementations of summary BFDs and their construction are described in the example implementations below. As described, summary BFDs calculated by the representative algorithm, or alternative algorithms, can distill hundreds and even thousands of individual node records into a much small number of nodes and edges and counts that are more easily and usefully interpreted.

The example implementations may have advantages from the attributes of the computer-implemented method for data input. For example, but not by way of limitation, reduced friction for data entry may increase user compliance, which facilitates more complete data capture and thus more effective and consequential data analysis. The example implementation system also gains flexibility in recording associations of data, allows templating of data capture, protects against duplication of data entry, and provides easy large-scale data curation or migration. The system may also generate by itself, or provide the generation of, information representing the entered data as a graph.

As discussed above, including the processing logic separately with the input data may provide for increased flexibility in the kinds of associations which can be recorded in the system. Records created from the data input may be associated with other records newly created in the system. In addition, retrieval of existing records means that any record to be input may be associated with any previously existing record.

Including the processing logic separately with the input data may have another benefit. Data may be captured for different runs of the same set of processes, resulting in the same kinds of data but different values. The same processing program can be applied to the different input data values, resulting in the capture of the both the old and new data values with the same structure. In other words, the data capture can be templated and automated.

In manufacturing, often there are no changes to the workflow. In such a case, the included processing logic may be used as is, resulting in no extra work or inconvenience in the data input handling. However, in situations such as research and development, often there are small differences in some of the processes or some of the data to be captured, and these can be handled with small changes to the included program, notably without any changes to the data input platform itself.

Another notable impact is that the permissiveness of the system means that users will encounter many fewer validation errors in their experience with the system. The system is designed to handle partially complete data. For example, in longer industrial workflows, often there are handoffs in the middle of the workflow between operators or shifts. This system allows for ingesting data at such a handoff point without worry. Only data that is given is recorded, and missing data need not prevent recording the given data. As more data are accumulated, those data (along with the previously handled data) may be uploaded into the system. Because the system recognizes the previous data, it does not attempt to create duplicate records, nor does it fail because of the duplications. It simply ignores those data and writes the appropriate new records when it encounters them.

Data migration is a curatorial activity that is difficult in related art data input systems. Once the structure of data for a workflow step is defined and stored, changing the representation of the data within the system is burdensome. In the related art, it cannot be done by the end user, but may require a software engineer or database expert to help pull out the existing data, change the structure of the storage, transform the data, and store it in its new representation. With such a high burden, data migration is often not attempted, meaning that historical data may be ignored in future analysis or that some users may choose simply to repeat the experiments to generate similar data but stored in the newer representation.

In the present example implementation, data migration is considerably simpler because the data input interface is sophisticated enough to make all the associations required for such an undertaking. For example, a researcher may initially track their Gas Chromatography (GC) runs as a single process with a variety of inputs such as Fermentation Samples and Dilution Factors for the dilutions performed as part of the GC run. But as the research program progresses, the research suspects the dilutions may explain some of the variation in the outputs of the GC runs. If the GC runs (with dilution parameters) could instead be modeled as Dilution runs (with appropriate values) followed by GC runs, the appropriate analysis of the data may be made.

A data migration is required to split the representation of a single GC process with a Dilution Factor input parameter, for example, into three processes where a first dilution process is fed into a second dilution process which is finally fed into the GC process. Without requiring any change to the data input platform, the relevant data can be exported, removed, and then re-imported with a new set of program instructions that now represent each previous GC run of interest as a sequence of 2 dilution processes followed by a GC process.

Having achieved the migration, the data for all of the migrated runs may now be included in newer analysis where the dilution and GC processes were already handled as separate entities. This may, for example, allow the researcher to build up a more accurate assessment for how newer experimental results compare to older historical runs, and make more informed decisions about how to proceed. By extending the shelf life of older data and allowing it to remain relevant as the understanding of the underlying data increases, the tracking of such historical data increases in value and maintains it over a longer lifespan. Increased data utility lifespan encourages compliance for data entry, completing the "virtuous" cycle provided by the data input platform.

If the software system is used to track records as states and transformations (for example, materials and processes), it provides for the generation of information which represents those records as a graph. For example, the states (materials) could be used to represent nodes in a graph, and the transformations (processes) may be used as edges in the graph. Similarly, both the states and transformations may be used to represent nodes in a graph, and the flow between them (for example, a material being used as an input into a process) may be used as edges in the graph. The associated records for each of the states and transformations could be recorded for each node/edge as a property of that node/edge and kept as part of the graph information.

The summary block flow diagrams provide for users to determine visually the similarities and differences within and between workflows. By compressing the information of graphs along dimensions which are shared amongst all of the sometimes hundreds or thousands of nodes, the summary BFDs highlight both the trends and the exceptions that are the basis of learning.

Inter-workflow visualization is now easily achieved with the summary BFDs. The large numbers of samples that pass through a single workflow could possibly be represented in a simple chain of blocks basically representing all the samples within each workflow step. When combined with a data input system which does not pre-define workflows, the graph representing any slice of node and edge parameters or samples can be generated flexibly.

The graph of the entire history of a selected set of samples may emerge from the documentation of individual graph associations made across multiple data entry events that are often asynchronous or uncoordinated. Similarly, the entire graph of multiple samples and their histories may emerge from a selected set of workflow processes through which those samples are associated indirectly. Each of these two kinds of graphs are generally a significant challenge to generate using related art systems.

In addition, users may create a variety of different summary BFDs for the same primary graphs, depending on the questions they are asking about them. For example, if user information is associated with the blocks, then a summary BFD may be generated where the blocks are differentiated by operator and summarized over all other dimensions (for example, the types or dates of processes).

Such summary BFDs may be created algorithmically based on any primary graph data where the nodes or edges have shared parameters (but possibly different values of those parameters). In the limit where the nodes or edges are separated by all possible characteristics, then the resulting summary BFD is simply the same as the initial graph representation. However, a user with access to a BFD summarization algorithm has the flexibility to generate a variety of more compact representations of that primary graph that highlight the similarities or differences amongst those shared parameters. Those similarities and differences would be much harder to discern in a visualization illustrating each individual node.

In addition, for situations in industrial research, development, or manufacturing, the underlying graph may represent states and transformations, such as materials and processes. These may represent a directed graph, as input materials are fed into child processes, and parent processes produce output materials. The underlying graph may be a bipartite graph, for example, where a material is linked only to processes (a parent process that creates the material, and child processes that take the material as input).

In any of these cases, a summary block flow diagram may be generated to improve the visualization. Multiple runs of similar workflows may be quickly compared, for example, by an analyst who did not perform the workflows, to understand what parameters were being tested. Or, for example, the provenances of several putatively similar materials may be inspected to determine if there were actually differences in the workflows of their creation.

It should also be noted that the combination of a data input system as described in this disclosure and the ability to generate summary block flow diagrams is extremely powerful. Because of the ease in recording the many relationships between records, the user is likely to have many shared parameters or characteristics for the underlying graphs representing their data. Because the underlying graphs are easy to generate in such a system, the summarized nodes and edges of the summary block flow diagrams may be generated in advance or on demand as needed, enabling rapid comparison and analysis of the various workflows of interest.

FIG. 1 illustrates the handling of input data in an example implementation of the data input platform, according to an example implementation. Data submitted to the system includes both input data 1002 and a set of instructions 1003, referred to as program data or a program (e.g., non-transitory computer readable medium including a set of executable instructions). The instructions 1006 may include information about subsets of the input data 1011, records and associations to create 1012, other associations to create 1013, any other information (not illustrated), or any combination thereof.

Each instruction, referred to as a directive, for example 1017, may be processed individually, in series or parallel, to construct records, for example 1019, which may then be written and stored in the storage system 1010. The constructed records may associate data between themselves, between records existing in the system (1008 and 1009), between the constructed and existing records, or any combination thereof. Because each directive refers to subsets of the input data, for example 1005, many sets of records may be constructed by a single directive. In the example shown, directive 1017, in processing the values 1016 of the input data subset 1005, creates records (1007, 1014, and 1015) which have associations with each other and some records in the system (1008 and/or 1009).

Figure 2A:
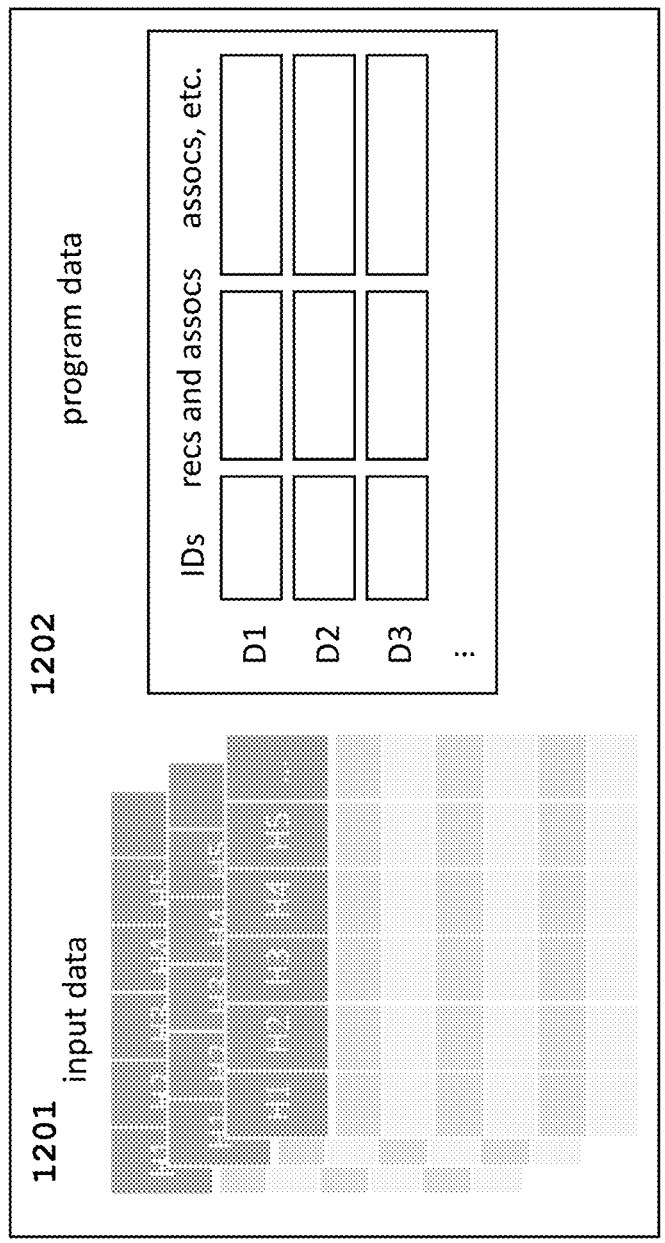
FIGS. 2A-2B illustrate the workflow of the data handling of input data in an example implementation of the data input platform.
Figure 2B:
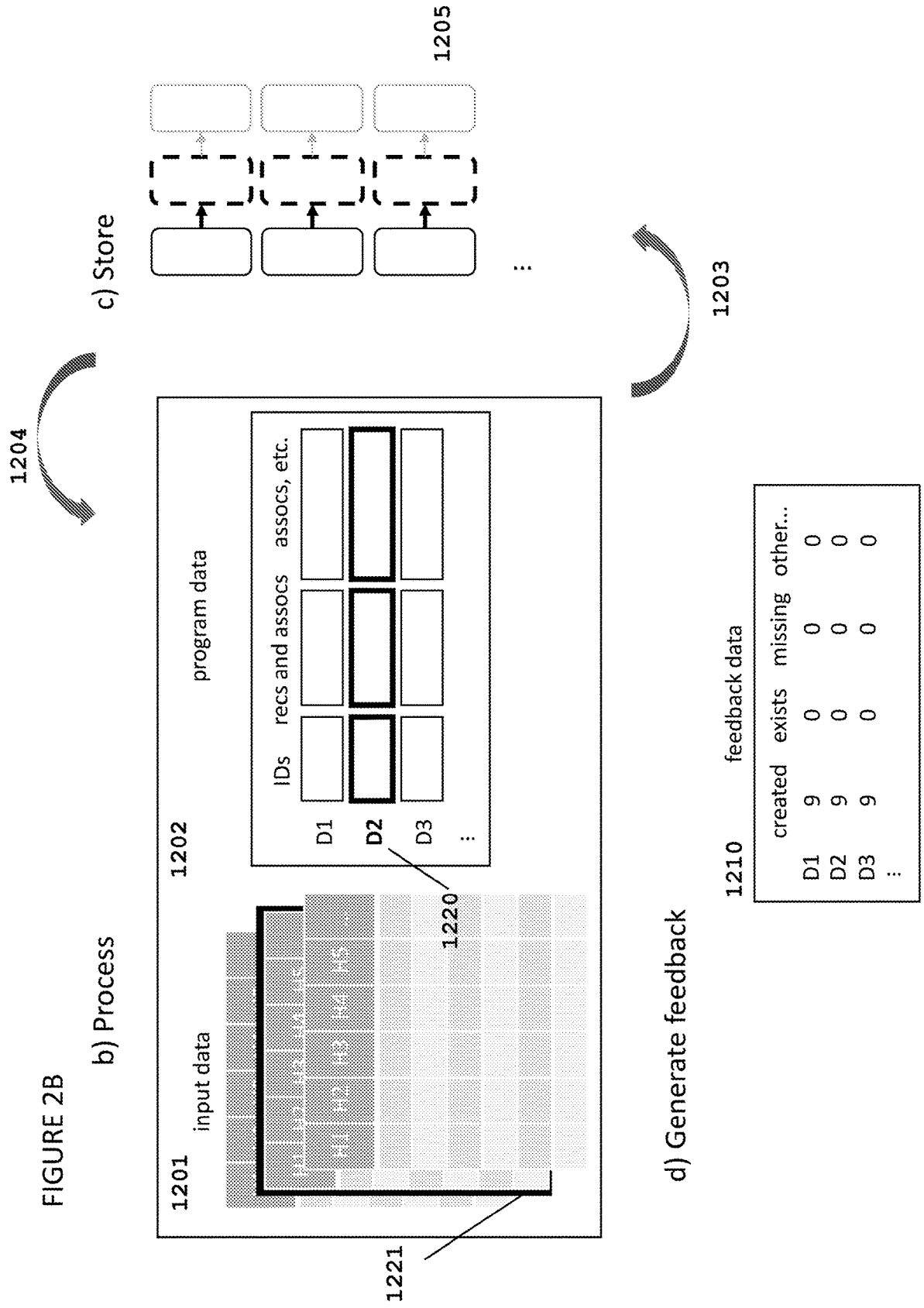

FIGS. 2A-2B illustrate the workflow of the data handling of input data in an example implementation of the data input platform.

In FIG. 2A, as shown in (a), submission or upload of the data to be processed is received by the system. The system parses the input data and set of instructions (program data).

Each directive of the program data is processed, either serially or in parallel. This is illustrated in FIG. 2B as a cycle for steps (b) and (c). At (b), for example, directive 1220 reads a subset of the input data 1221. Using those values and the values of the directive, the platform may retrieve records existing in the system and construct a set of records and associations. At (c), those records are then written to the storage system 1205 of the platform. At (d), feedback data is generated in the course of the data handling in steps (b) and (c), and may be returned to the user, stored on the system, ignored, or any combination thereof.

Figure 3A:
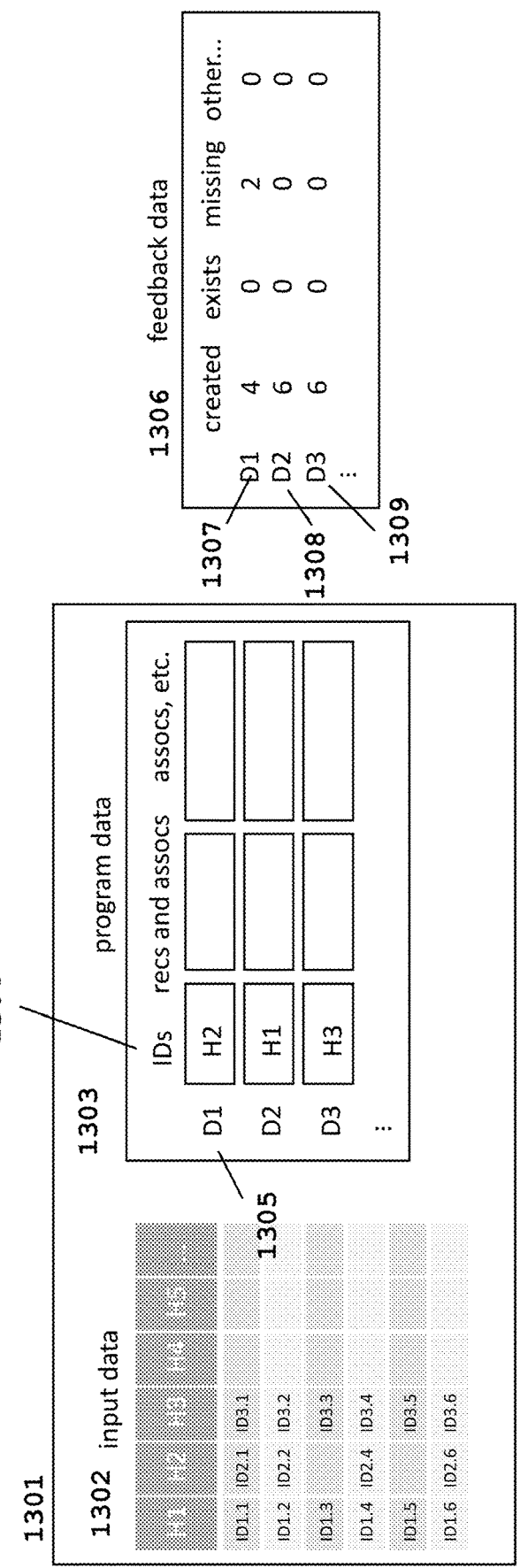
FIGS. 3A-3B illustrate the possible usage of one example implementation of the data input platform.
Figure 3B:
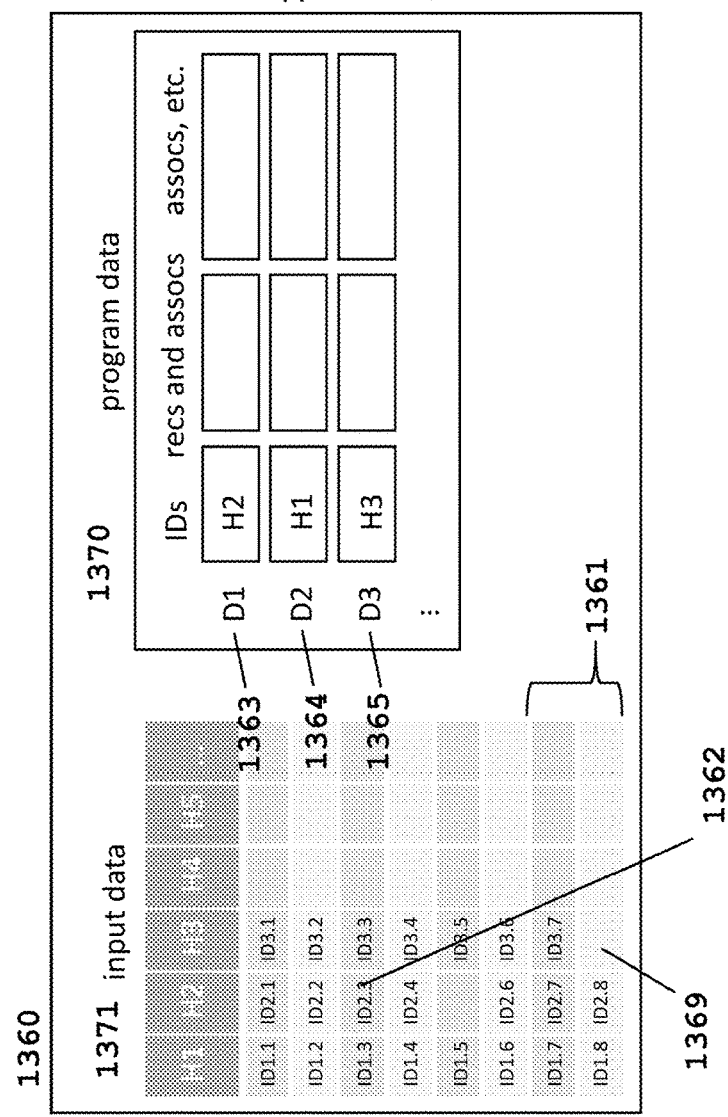

FIGS. 3A-3B illustrate the possible usage of one example implementation of the data input platform. This example implementation is configured to ignore values which are missing from the input data or which refer to existing records. In addition, the example implementation is configured to provide feedback about the number of records created, existing records ignored, and missing input values.

As shown in FIG. 3A, at (a) the first submission of data 1301 is shown. In this example, the program data 1303 comprises three directives, using the identifiers subset 1304 to refer to values in the input data (in this case a column given by a header). The first directive 1305, using the values of the column H2 of the input data, creates four records and ignores the two missing values of the input data column. In this example, the feedback data 1306, a subset of the feedback data 1307 is generated to indicate that four records were created and two values were ignored. In a similar manner, the other directives, referring to columns of the input data with complete information, each create six records which are recorded in the feedback 1308 and 1309.

As shown in FIG. 3B, at (b) subsequently, the platform receives the submission of data 1360. In this example, the program data is identical to the previous program data 1303. Note that the input data is identical to the previous input data 1301 with two differences: a value is in the cell 1362, and there are two additional rows 1361. The handling of the directive 1363 results in three created records (the two values from the new rows and the value corresponding to the previously missing value 1362). Four values of the input data were in the previous submission, and so the corresponding records exist in the system and are ignored. There is one value missing from the input data. The feedback data for this directive 1366 reflects the results of the directive handling. The other two directives 1364 and 1365 result in feedback data 1367 and 1368 which show the results of handling those directives.

Figure 4:
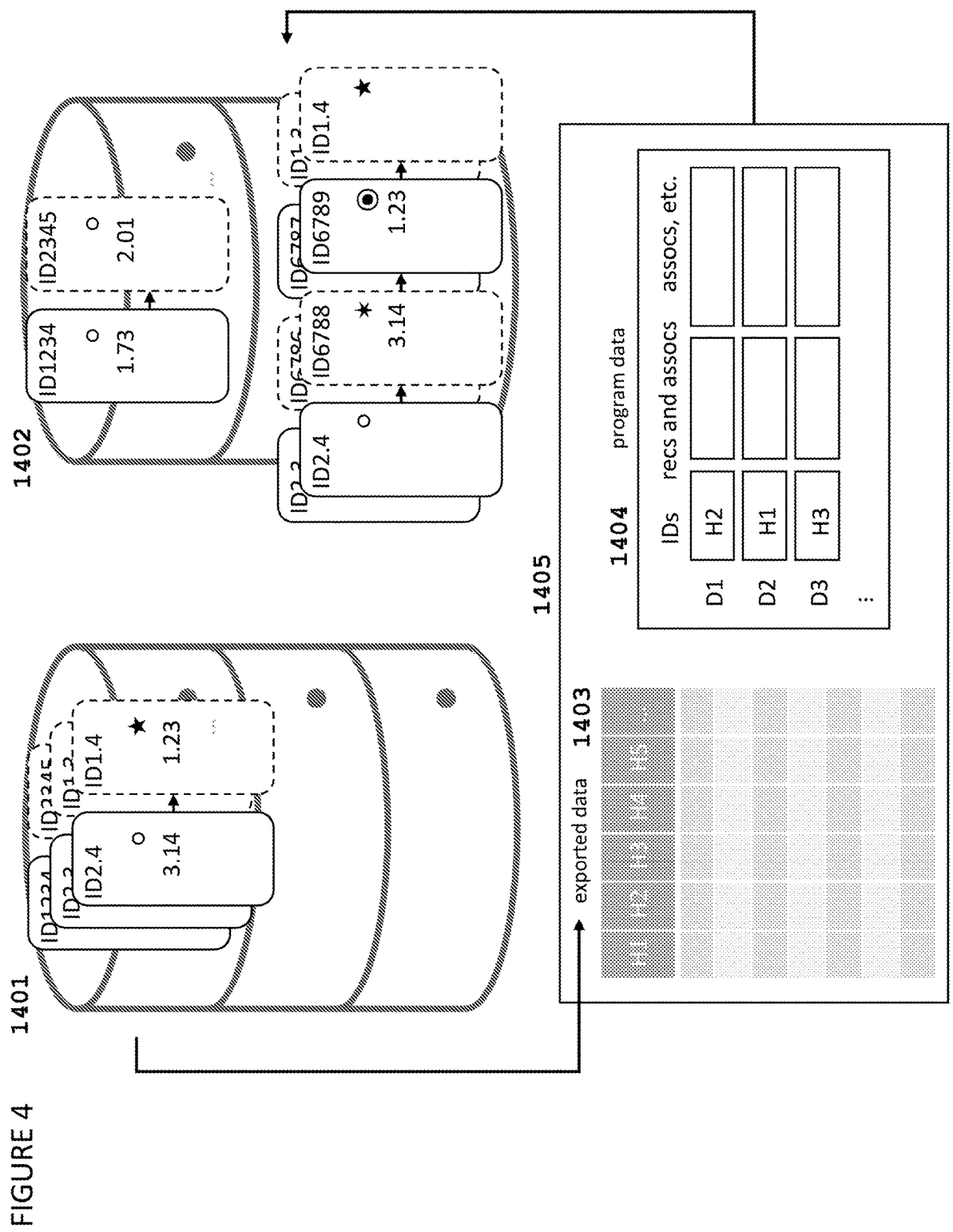
FIG. 4 illustrates an example implementation of the data input platform used for data migration.

FIG. 4 illustrates an example implementation of the data input platform used for data migration. Given an existing set of records 1401 in the system, data representing those records may be exported as data 1403. The exported data 1403 may then be adjusted based on the migration desired. The adjusted data is then paired with program data 1404, with a set of instructions for handling the adjusted data. The submitted data 1405 is then used to update the records in the system accordingly, resulting in an updated set of records 1402 in the system.

Figure 5A:
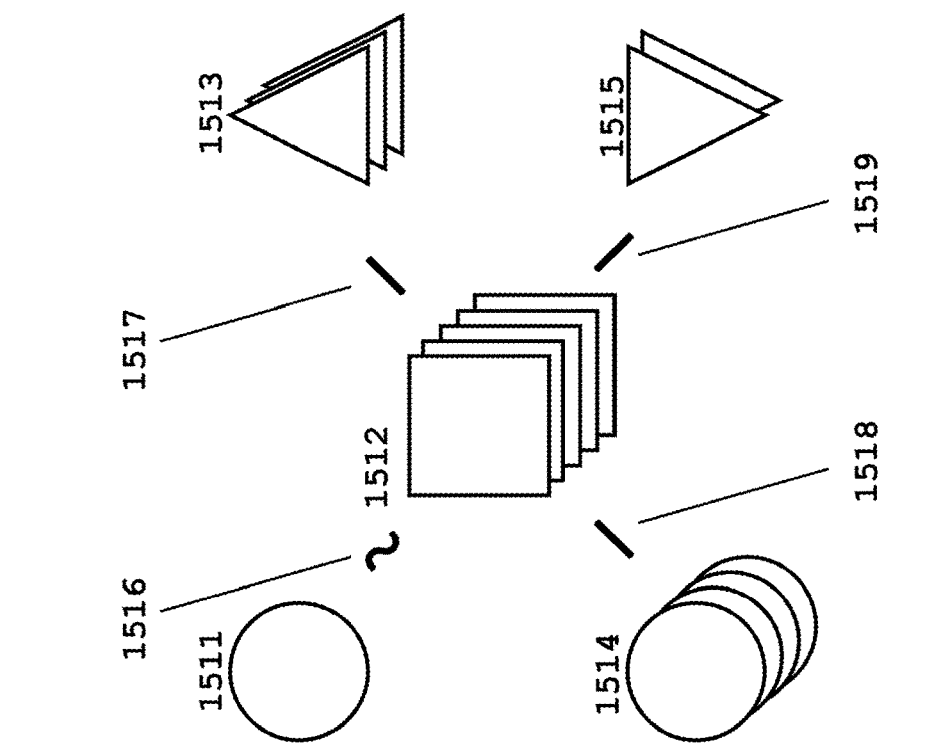
FIGS. 5A-5B illustrates the representation of an example graph and two example representative summary Block Flow Diagrams (BFDs) representing it according to an example implementation.
Figure 5A:
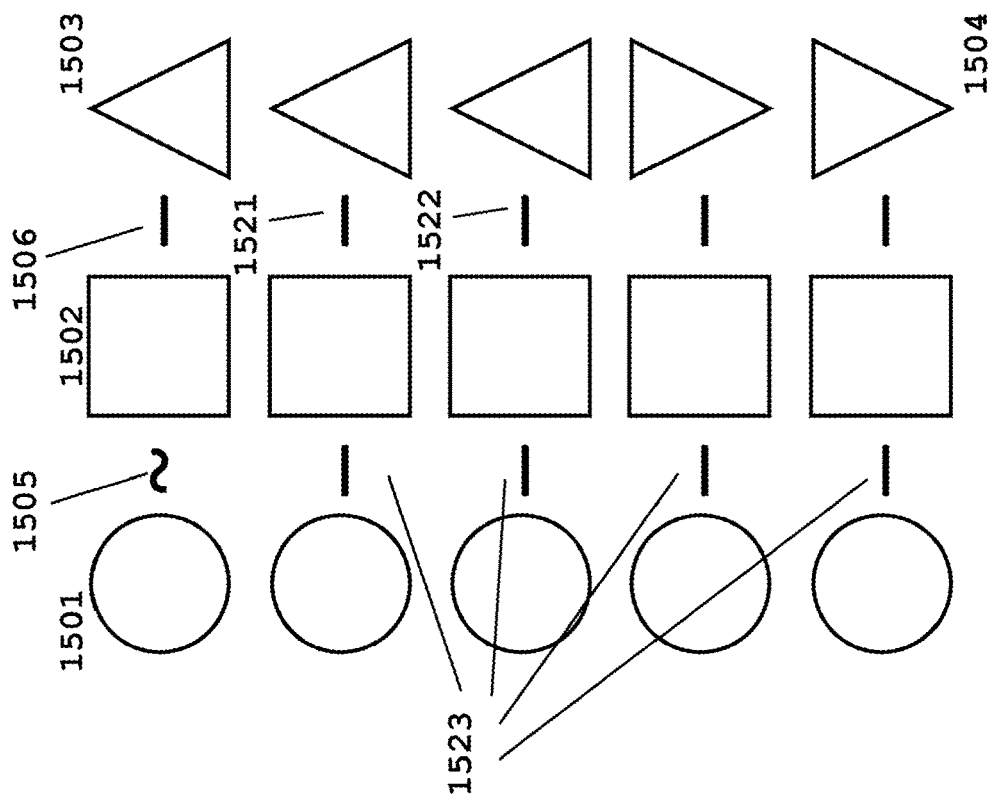
Figure 5B:
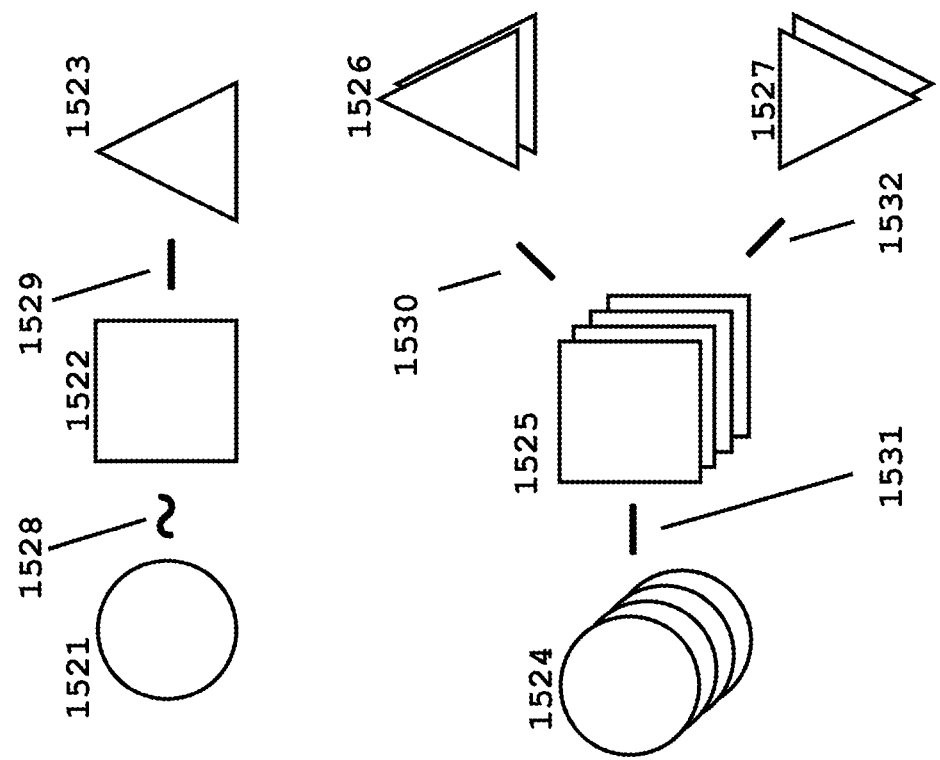

FIGS. 5A-5B illustrates the representation of an example graph and two example representative summary Block Flow Diagrams (BFDs) representing it according to an example implementation. In FIG. 5A at (a), a graph of nodes and edges is shown. The nodes 1501, 1502, 1503, and 1504 are shown with different shapes to denote a parameter value associated with each node classification. For example, there are 5 nodes 1501 with the same classification, and 3 nodes of the classification 1503. The nodes are connected by edges, for example 1505 and 1506. The edges fall into two classifications, where there is one edge of the classification 1505 and nine edges of the classification 1506. Note that there are 15 nodes and 10 edges to be displayed in this graph.

In FIG. 5A at (b), a representation of a summary BFD which represents the primary graph shown. In this case there are blocks 1511, 1512, 1513, 1514, and 1515. A shape of each block denotes the node classification to which it corresponds. For example, blocks 1511 and 1514 represent the node classification 1501. In addition, each block may represent a different number of nodes from the primary graph, denoted by the "stack" of shapes. For example, block 1514 represents four nodes as it resembles a stack of four shapes, and block 1512 represents five nodes as it resembles a stack of five shapes. The edges of the summary BFD 1516, 1517, 1518, and 1519 are similarly shaped to represent the primary edge classification to which it corresponds. For example, edge 1516 represents the edge classification of edge 1505.

In FIG. 5B at (c) a different valid representative summary BFD of the same primary graph shown in (a). This summary BFD has more nodes (7 vs. 5) and edges (5 vs. 4) than the summary BFD shown in (b). However, it still accurately reflects the numbers of nodes, the numbers of edges, and the connectivity between nodes and edges of the primary graph.

Figure 6A:
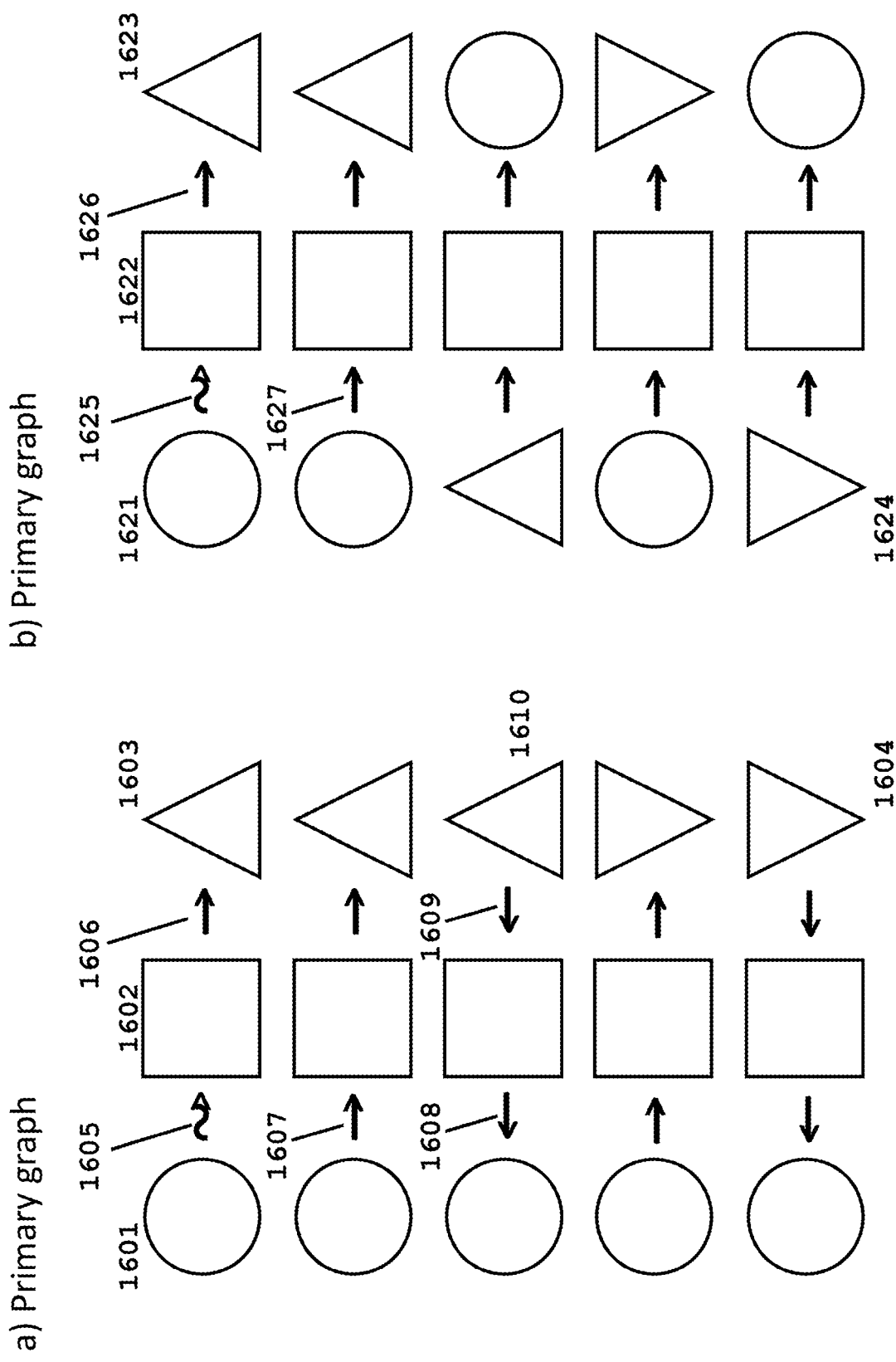
FIGS. 6A-6B illustrate the representation of an example directed graph and two example representative summary Block Flow Diagrams (BFDs) representing it.
Figure 6B:
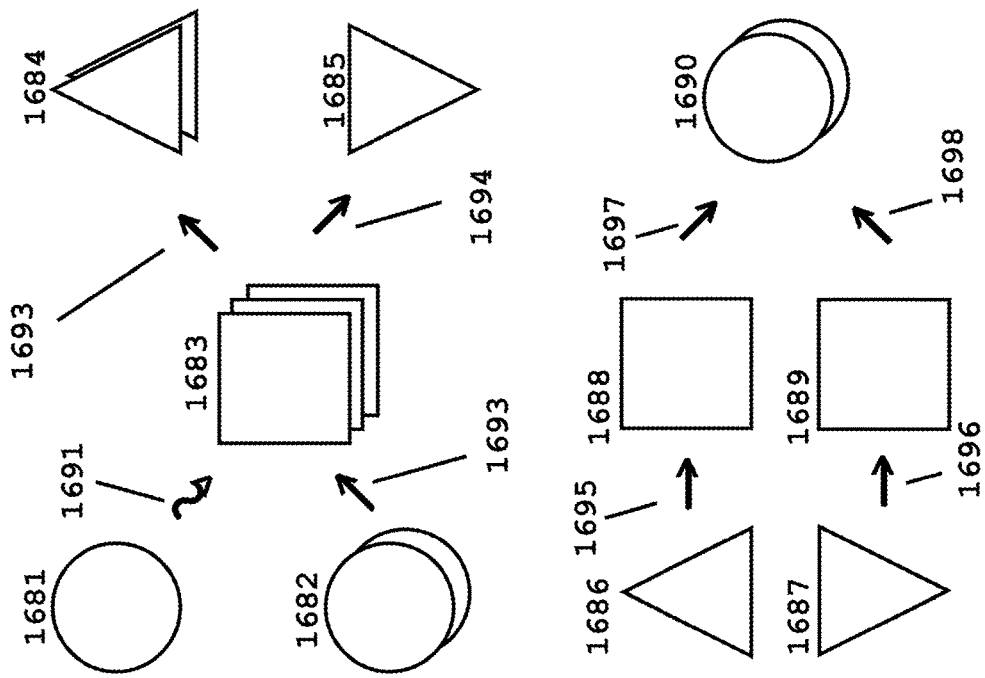
Figure 6B:
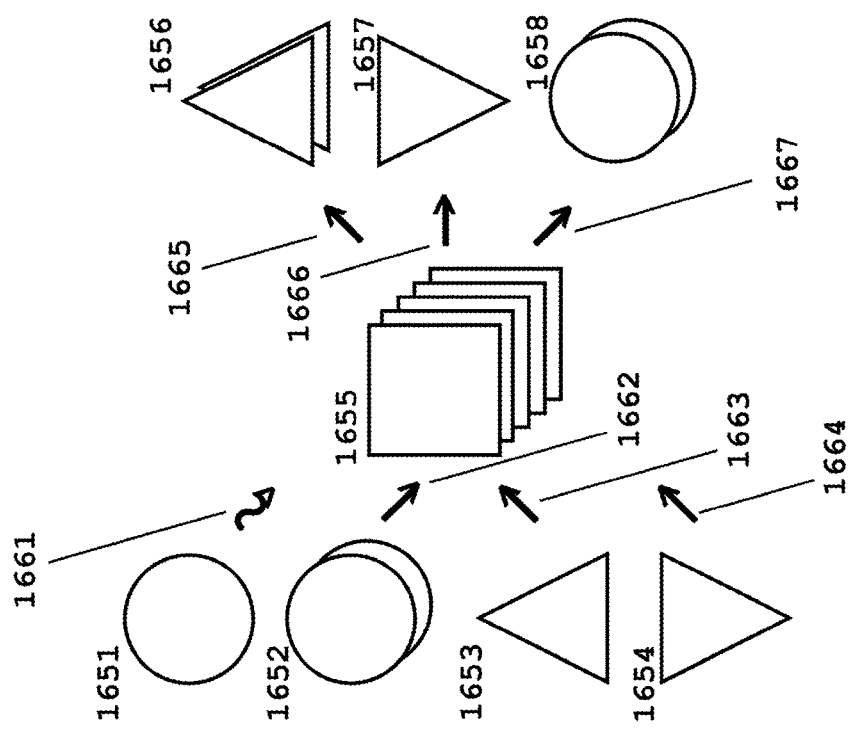

FIGS. 6A-6B illustrate the representation of an example directed graph and two example representative summary Block Flow Diagrams (BFDs) representing it.

In FIG. 6A, at (a) a directed graph of nodes and edges is shown. Note that the nodes and the connectivity of edges shown in this graph is the same as in FIG. 5A. However, because this is a directed graph, the edges correspond to ordered pairs of nodes. This is denoted as an arrow for each edge, depicting its "source" node as the node close to the tail of the arrow and its "destination" node as the node close to the head of the arrow. For example, edge 1605 connects its source node 1601 to its destination node 1602. Note that edges 1608 and 1609 as shown are facing in the opposite direction as most of the other edges, for example 1605, 1606, and 1607.

In FIG. 6A, at (b) the same directed graph of nodes and edges as shown in (a). The only change in this graph is that the nodes have been adjusted so that all of the edges (arrows) are facing the same direction such that source nodes are on the left of the arrows and destination nodes are on the right of the arrows. For example, node 1624 is in a different position than its corresponding node 1604 in part (a).

In FIG. 6B at (c), a representation of a summary BFD which represents the primary graph shown in (a) and (b). The central block 1655, representing 5 nodes of the classification 1602 (or 1622), has many edges connected to it. There are many "input" blocks 1651, 1652, 1653, and 1654 which have edges 1661, 1662, 1663, and 1664 pointing to block 1655 as a destination block. There are also "output" blocks 1656, 1657, and 1658 which have edges 1665, 1666, and 1667 pointing away from block 1655 as a source block. Note that the change to a directed graph (with the choice of directions) results in a very different looking summary BFD from FIGS. 5A-5B.

In FIG. 6B at (d), a different valid representative summary BFD of the same primary graph shown in (a) and (b). This summary BFD has more nodes (9 vs. 8) and edges (8 vs. 7) than the summary BFD shown in (c). However, it still accurately reflects the numbers of nodes, the numbers of edges, and the connectivity between nodes and edges of the primary graph.

Figure 7A:
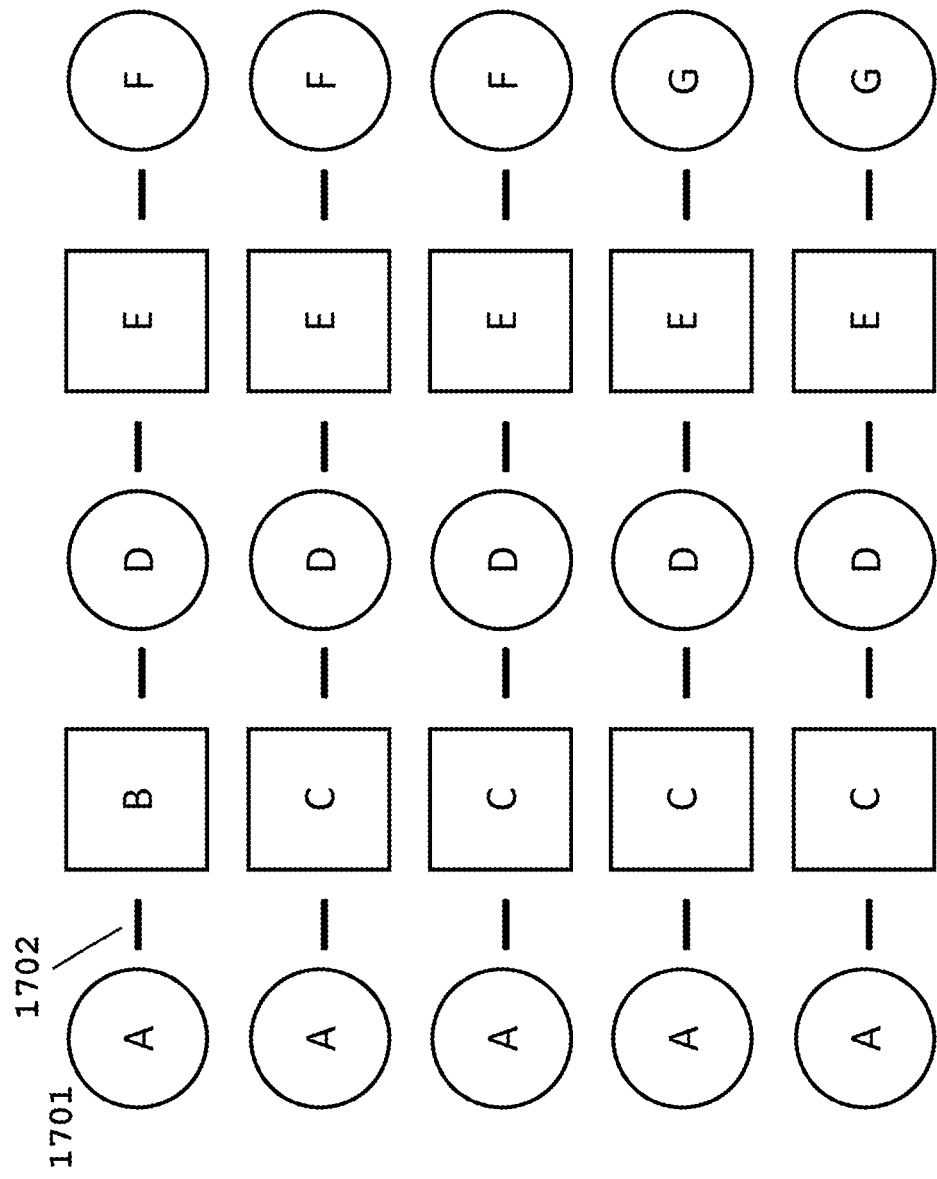
FIGS. 7A-7B illustrates the representation of an example bipartite graph and an example representative summary Block Flow Diagram (BFD) representing it.
Figure 7B:
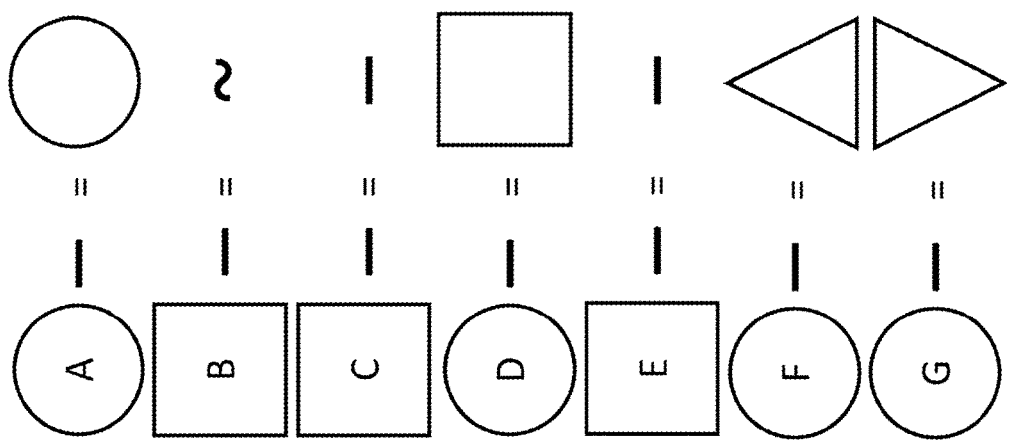
Figure 7B:
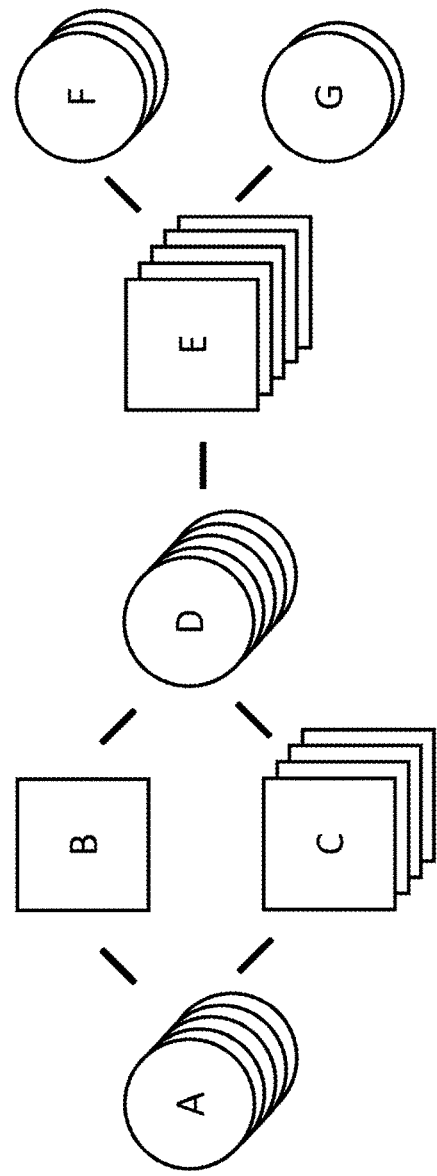

FIGS. 7A-7B illustrates the representation of an example bipartite graph and an example representative summary Block Flow Diagram (BFD) representing it.

In FIG. 7A, at (a) a bipartite graph of nodes and edges is shown. Unlike previous figures, the shapes of the nodes do not illustrate their node classifications, but illustrate the subset of node classifications to which the node belongs. The node classifications are illustrated by the letters labeling the nodes, for example, A, B, C, D, E, F, and G are separate node classifications. It can be seen that one subset of node classifications, denoted by the circles, includes node classifications A, D, F, and G. The other subset, denoted by squares, includes B, C, and E. Note that, as fitting the definition of a bipartite graph, any circular node is only connected by edge(s) to square node(s), and similarly, any square node is only connected to circular node(s).

In FIG. 7B, at (b) a representation of a summary BFD which represents the primary bipartite graph shown in (a). As in previous figures, the "stack" drawing of each block illustrates the number of nodes represented. For example, the block A represents 5 nodes of the classification A from (a). Note that the summary BFD itself is a bipartite graph because it represents a primary graph that is bipartite.

Figure 8A:
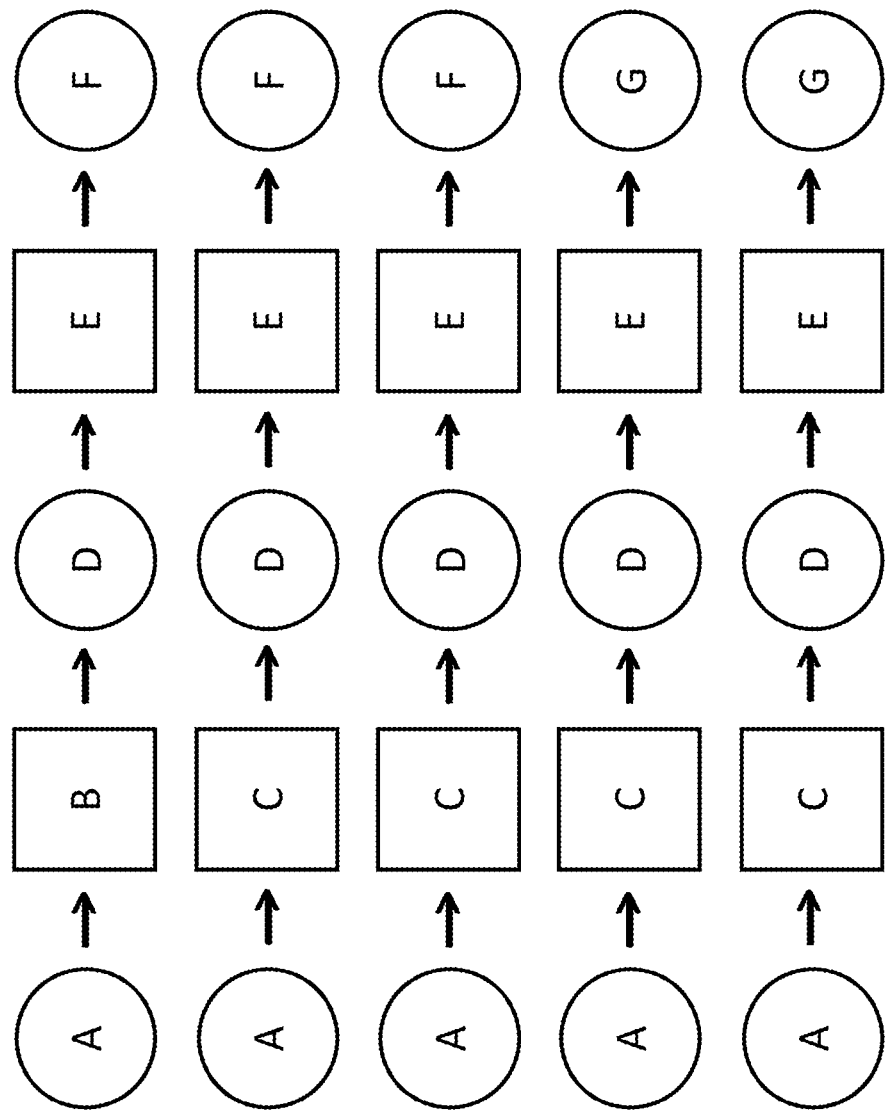
FIGS. 8A-8B illustrate the representation of an example directed bipartite graph and two example representative summary Block Flow Diagrams (BFDs) representing it.
Figure 8B:
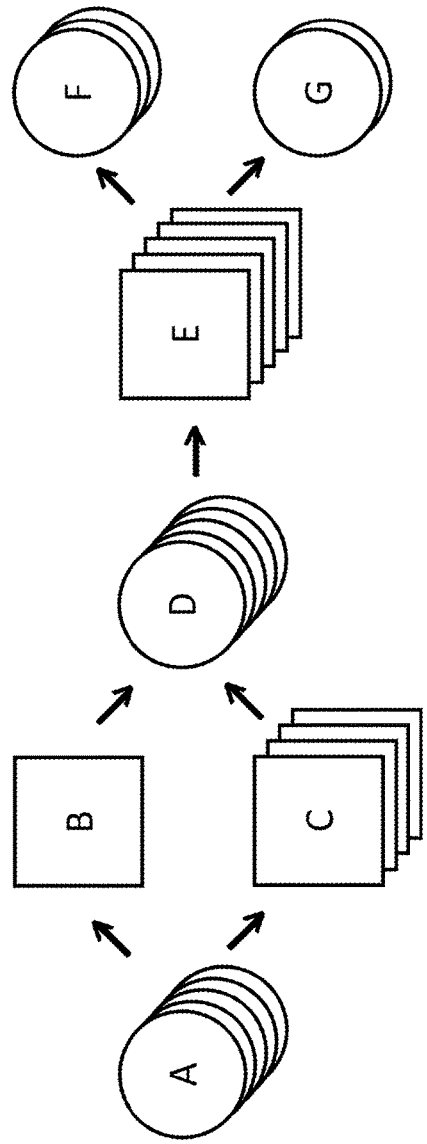
Figure 8B:
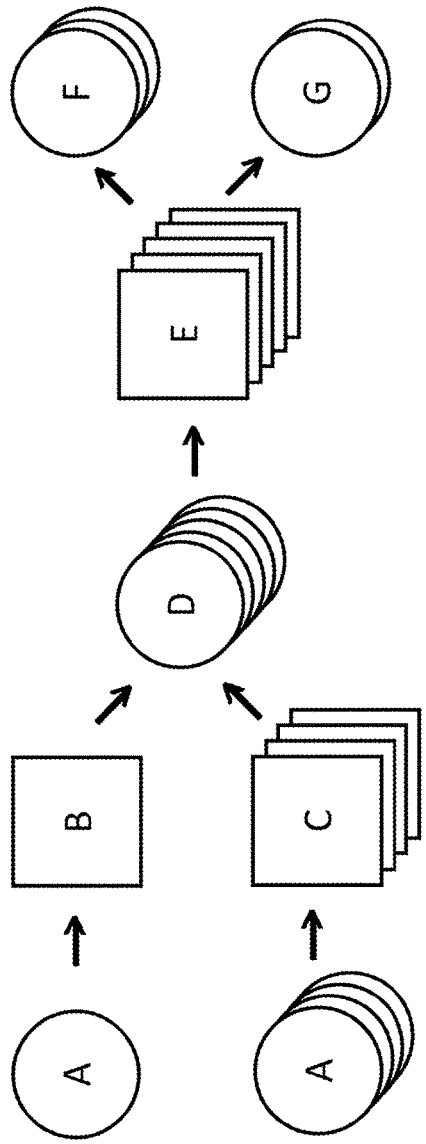

In FIG. 7B, at (c) an illustration of a transformation map between the primary graph of (a) and the primary graph of FIG. 5A. Using such a graph transformation (and its reverse transformation) may be useful in the calculation of summary BFDs, by first reducing the dimensionality of a primary graph with a transformation, calculating the summary BFD representation of the transformed graph, and then using the reverse transformation to generate the final summary BFD. As shown in the transformation map, each pair of a node and edge of the bipartite graph may be represented as a corresponding node or edge. The result of the transformation (by replacing each node/edge pair with its corresponding node or edge) is the primary graph of FIG. 5A, with a substantially reduced number of nodes and edges. FIGS. 8A-8B illustrate the representation of an example directed bipartite graph and two example representative summary Block Flow Diagrams (BFDs) representing it.

In FIG. 8A, at (a) a directed bipartite graph of nodes and edges is shown. As in FIGS. 7A-7B, the node classifications are illustrated by the letters labeling the nodes, for example, A, B, C, D, E, F, and G are separate node classifications. It can be seen that one subset of node classifications, denoted by the circles, includes node classifications A, D, F, and G. Note that, as fitting the definition of a bipartite graph, any circular node is only connected by edge(s) to square node(s), and similarly, any square node is only connected to circular node(s). The edges of the graph are directed, illustrated as arrows connecting a source block to a destination block.

In FIG. 8A, at (b) a representation of a summary BFD which represents the primary bipartite graph shown in (a). As in previous figures, the "stack" drawing of each block illustrates the number of nodes represented. For example, the block A represents 5 nodes of the classification A from (a). Note that the summary BFD itself is a bipartite graph because it represents a primary graph that is bipartite.

In FIG. 8A, at (c) another valid representation of a summary BFD which represents the primary bipartite graph shown in (a). As in previous figures, the "stack" drawing of each block illustrates the number of nodes represented. For example, here there are two blocks of classification A, with one block (circle) representing one node and the other block representing four nodes ("stack" of circles).

Figure 9:
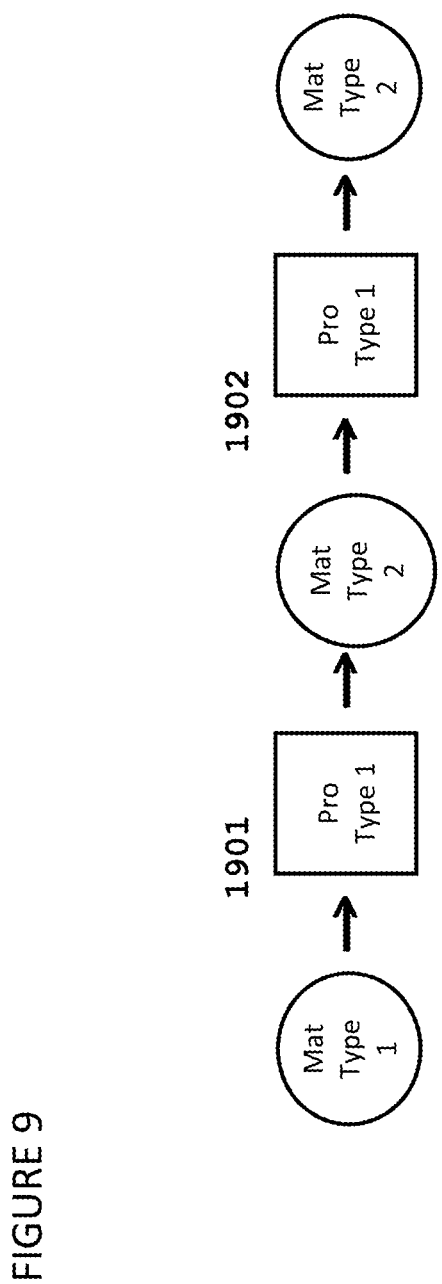
FIG. 9 illustrates a primary graph according to the example implementations.

FIG. 9 illustrates a primary graph according to the example implementations. The node classifications, referred to as "type", are labeled in the nodes. In this case there are two nodes of type "Pro Type 1", which are connected in a chain. With such connectivity, there exists a "branch" describing two materials ("Mat Type 1" and "Mat Type 2") that are connected through both of the nodes of type "Pro Type 1". The "branch" element is described in further detail below.

Figure 10:
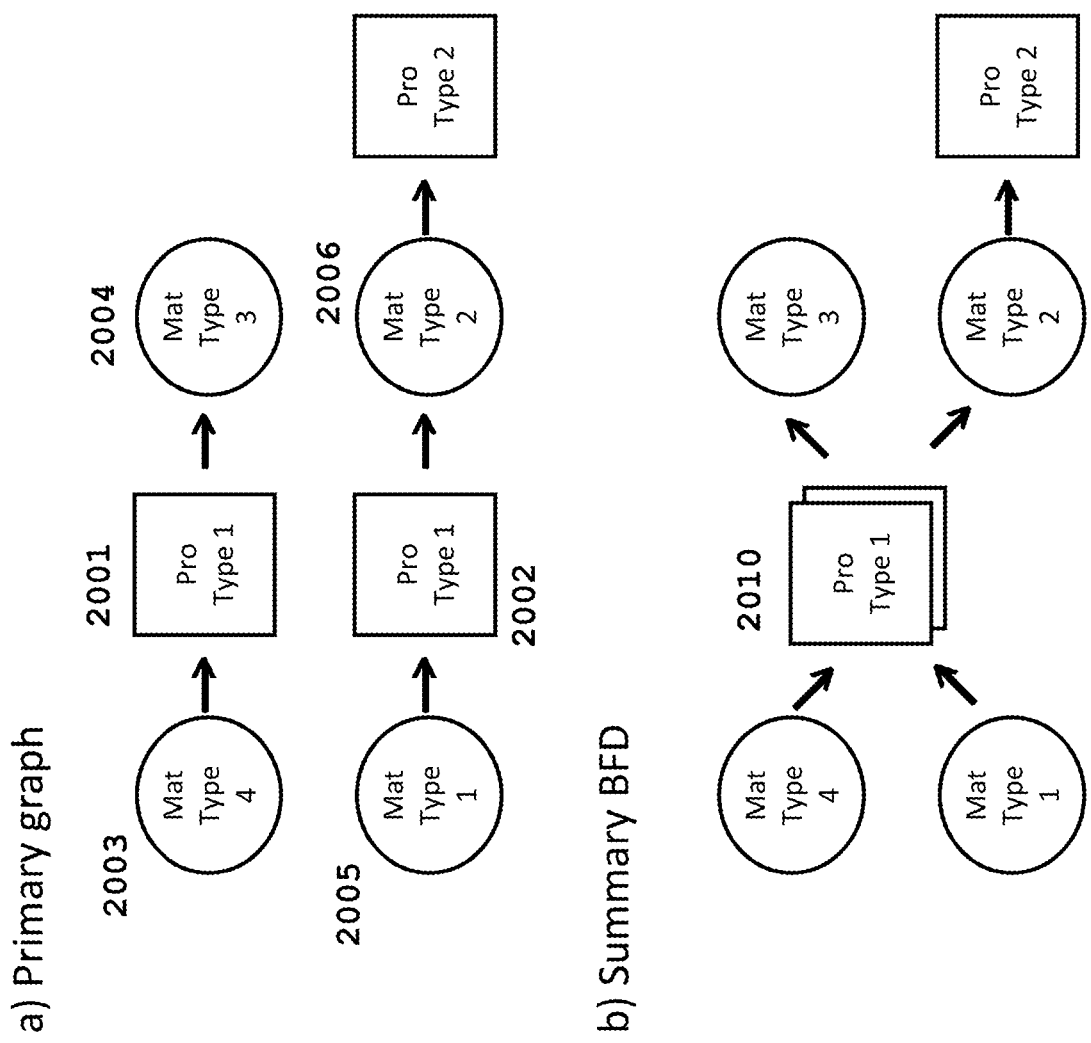
FIG. 10 illustrates a primary graph and an example representative summary BFD according to the example implementations.

FIG. 10 illustrates a primary graph and an example representative summary BFD according to the example implementations. The node classifications, referred to as "type", are labeled in the nodes. Nodes which connect to a designated node through a path of edges as destination node are referred to as "upstream" nodes, and nodes which the designated node connect to through a path of edges as a source node are referred to as "downstream" nodes.

At (a) note that for the primary graph, there are two nodes of the same type "Pro Type 1", for which there is no branch that connects through both nodes. There are also no upstream or downstream node types in common between them.

At (b) in the summary BFD representation, the two "Pro Type 1" nodes are represented by a single block, which is notated as a "stack" of two squares to show that it represents two nodes of the primary graph. Each of the other nodes is represented separately as one block for each node.

Figure 11:
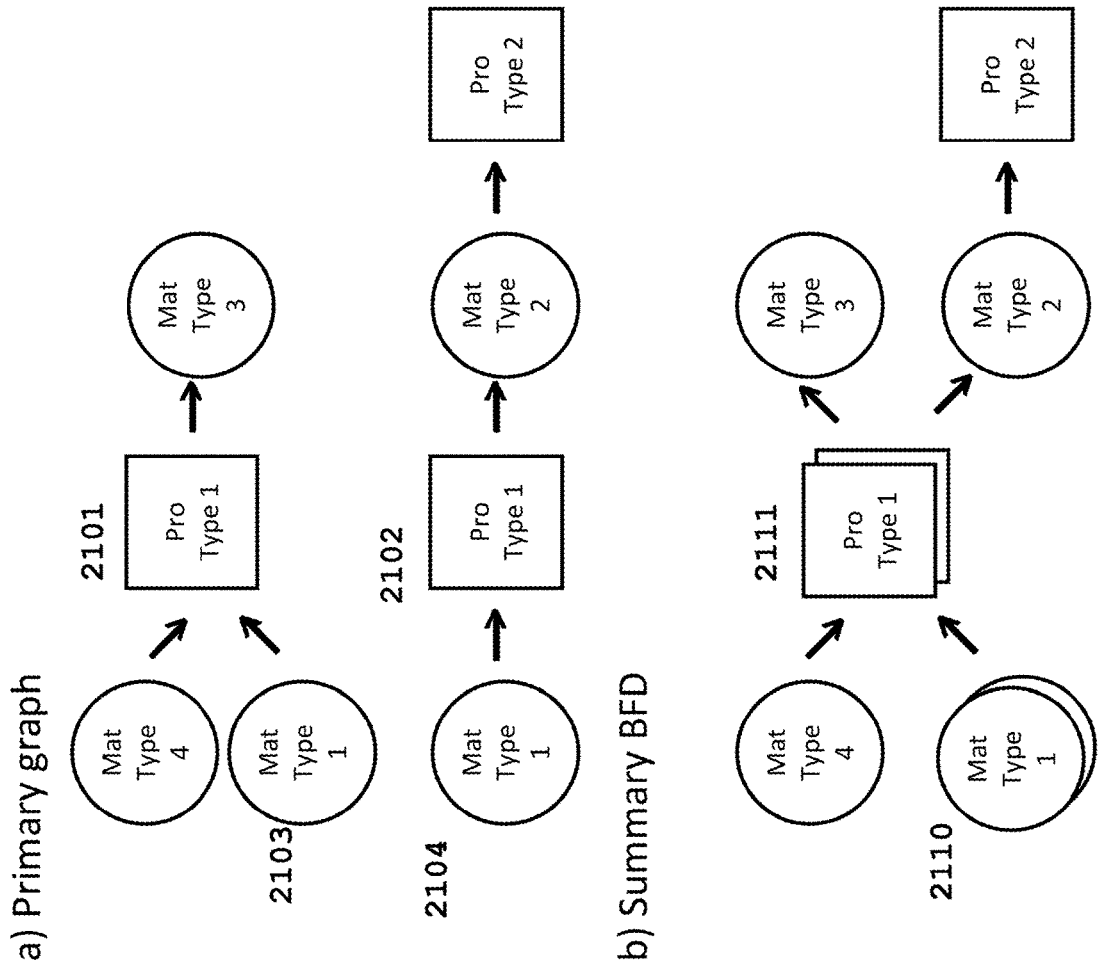
FIG. 11 illustrates a primary graph and an example representative summary BFD according to the example implementations.

FIG. 11 illustrates a primary graph and an example representative summary BFD according to the example implementations. The node classifications, referred to as "type", are labeled in the nodes. Nodes which connect to a designated node through a path of edges as destination node are referred to as "upstream" nodes, and nodes which the designated node connect to through a path of edges as a source node are referred to as "downstream" nodes.

At (a) note that for the primary graph, there are two nodes of the same type "Pro Type 1", for which there is no branch that connects through both nodes. There is, however, one common upstream node type "Mat Type 1", where each of the "Pro Type 1" nodes is connected by an edge to a "Mat Type 1" node directly as the destination node.

At (b) in the summary BFD representation, the two "Pro Type 1" nodes are represented by a single block, which is notated as a "stack" of two squares to show that it represents two nodes of the primary graph. In a similar manner, the two "Mat Type 1" nodes are represented as a single block, and there is a single edge connecting these two blocks.

Figure 12:
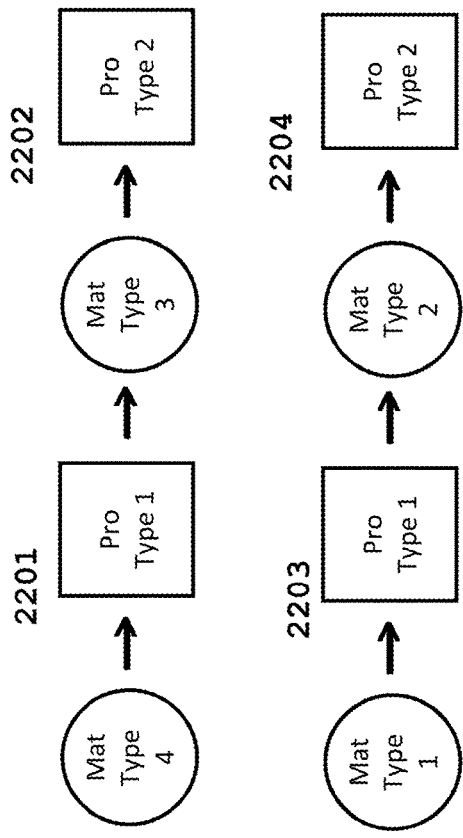
FIG. 12 illustrates a primary graph and an example representative summary BFD according to the example implementations.
Figure 12:
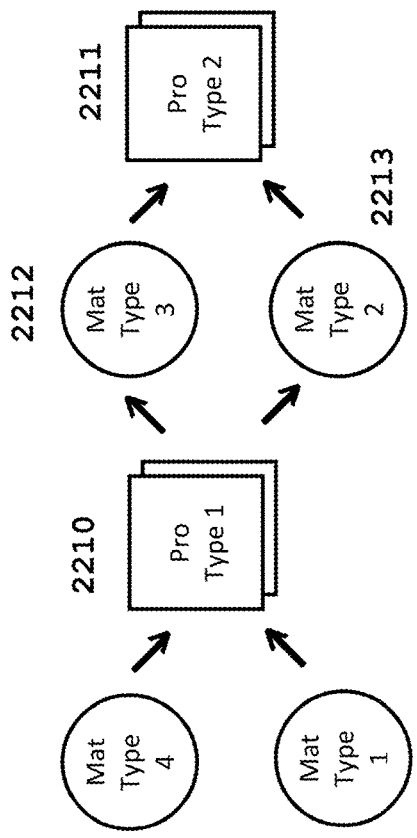

FIG. 12 illustrates a primary graph and an example representative summary BFD according to the example implementations. The node classifications, referred to as "type", are labeled in the nodes. Nodes which connect to a designated node through a path of edges as destination node are referred to as "upstream" nodes, and nodes which the designated node connect to through a path of edges as a source node are referred to as "downstream" nodes.

At (a) note that for the primary graph, there are two nodes of the same type "Pro Type 1", for which there is no branch that connects through both nodes. There is, however, one common downstream node type "Pro Type 2", where each of the "Pro Type 1" nodes is connected by a series of edges to a node of "Pro Type 2". In both cases, there are the same number of edges (in this case 2) between the nodes of "Pro Type 1" and "Pro Type 2", illustrating that both nodes are connected to the downstream node at the same "distance".

At (b) in the summary BFD representation, the two "Pro Type 1" nodes are represented by a single block, which is notated with a "stack" of two squares to show that it represents two nodes of the primary graph. In a similar manner, the two "Pro Type 2" nodes are represented as a single block. Because the distance between the two blocks is 2, there is one intervening block for each of the two pairs of nodes, in this case a "Mat Type 2" and a "Mat Type 3" block.

Figure 13:
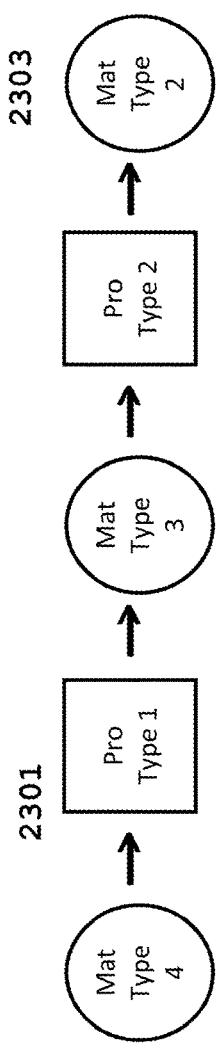
FIG. 13 illustrates a primary graph and an example representative summary BFD according to the example implementations.
Figure 13:
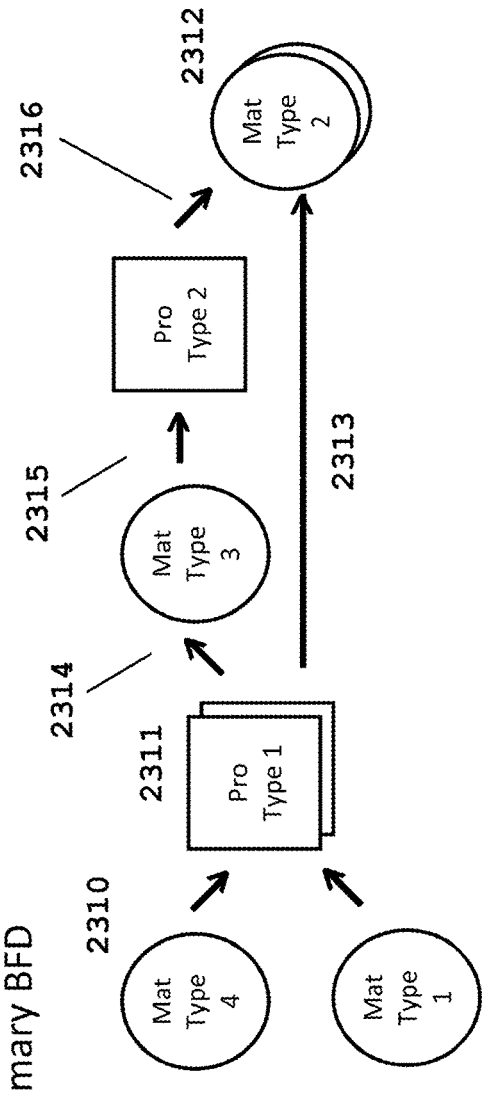

FIG. 13 illustrates a primary graph and an example representative summary BFD according to the example implementations. The node classifications, referred to as "type", are labeled in the nodes. Nodes which connect to a designated node through a path of edges as destination node are referred to as "upstream" nodes, and nodes which the designated node connect to through a path of edges as a source node are referred to as "downstream" nodes.

At (a) note that for the primary graph, there are two nodes of the same type "Pro Type 1", for which there is no branch that connects through both nodes. There is, however, one common downstream node type "Mat Type 2", where each of the "Pro Type 1" nodes is connected by a series of edges to a node of "Pro Type 2". However, in each case there is a different distance between the nodes of "Pro Type 1" and "Pro Type 2". In this case the nodes are connected by either 1 or 3 edges, with 0 or 2 intervening nodes.

At (b) in the summary BFD representation, the two "Pro Type 1" nodes are represented by a single block, which is notated with a "stack" of 2 squares to show that it represents two nodes of the primary graph. In a similar manner, the two "Mat Type 2" nodes are represented as a single block. Because the distance between the two blocks is different, there are paths of different lengths between the two blocks. For one path, there is a direct edge, and for the other path, there are two intervening blocks of type "Mat Type 3" and "Pro Type 2".

Figure 14:
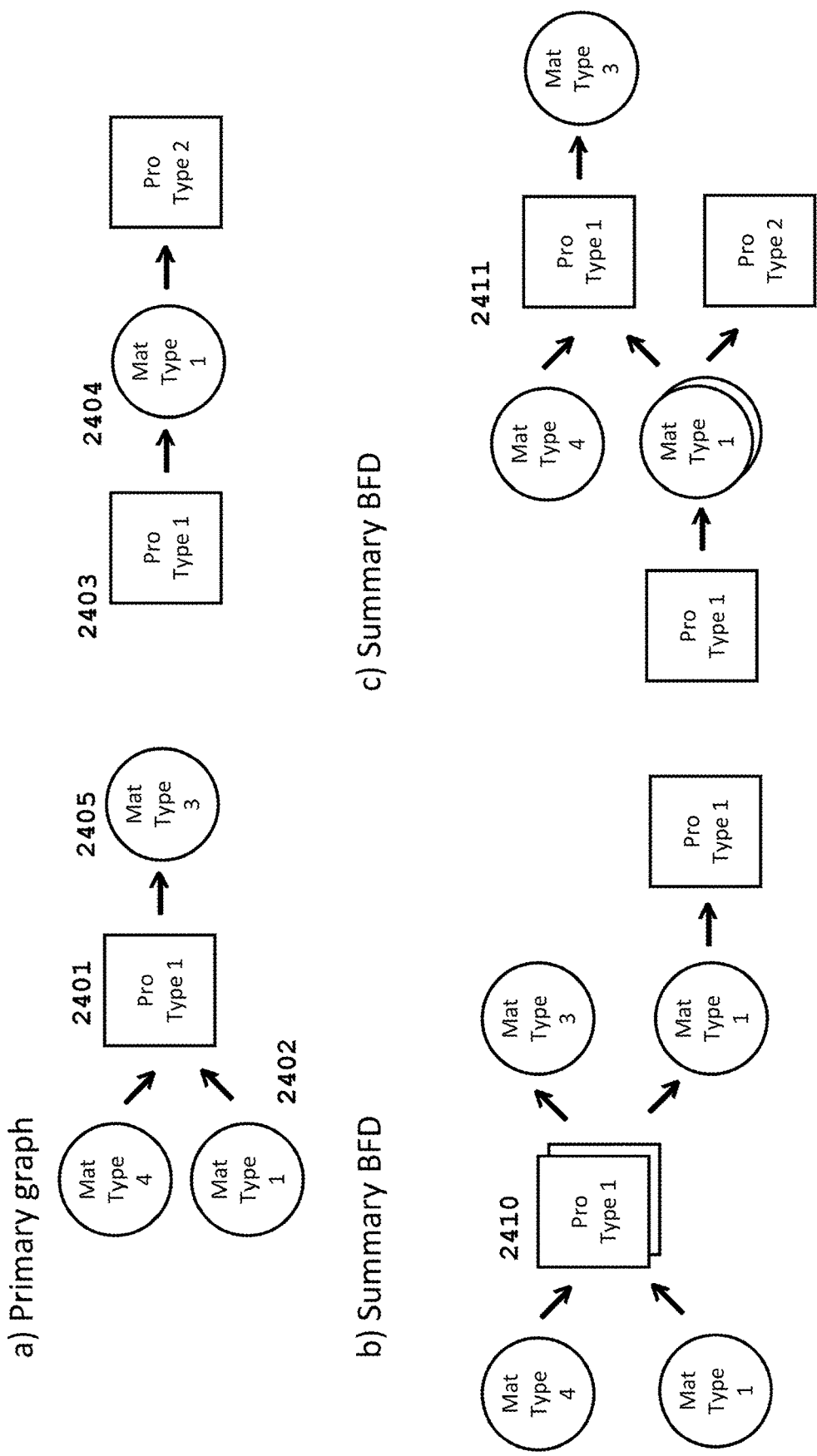
FIG. 14 illustrates a primary graph and two example representative summary BFDs according to the example implementations.

FIG. 14 illustrates a primary graph and two example representative summary BFDs according to the example implementations. The node classifications, referred to as "type", are labeled in the nodes. Nodes which connect to a designated node through a path of edges as destination node are referred to as "upstream" nodes, and nodes which the designated node connect to through a path of edges as a source node are referred to as "downstream" nodes.

At (a) note that for the primary graph, there are two nodes of the same type "Pro Type 1", for which there is no branch that connects through both nodes. There is, however, for one of the nodes, a downstream node type "Mat Type 1", which is an upstream node type for the other node.

At (b) in this summary BFD representation, the two "Pro Type 1" nodes are represented by a single block, which is notated with a "stack" of two squares to show that it represents two nodes of the primary graph. For the two blocks representing the two "Mat Type 1" nodes in the summary BFD, one is upstream of the "Pro Type 1" block, and the other is downstream.

At (c) in this summary BFD representation, it is the two "Mat Type 1" nodes that are represented by a single block, which is notated with a "stack" of two circles to show that it represents two nodes of the primary graph. The choice of which type of nodes to consolidate can be made via any logic, and any choice results in a valid summary BFD. For the two blocks representing the two "Pro Type 1" nodes in the summary BFD, one is upstream of the "Mat Type 1" block, and the other is downstream.

Figure 15:
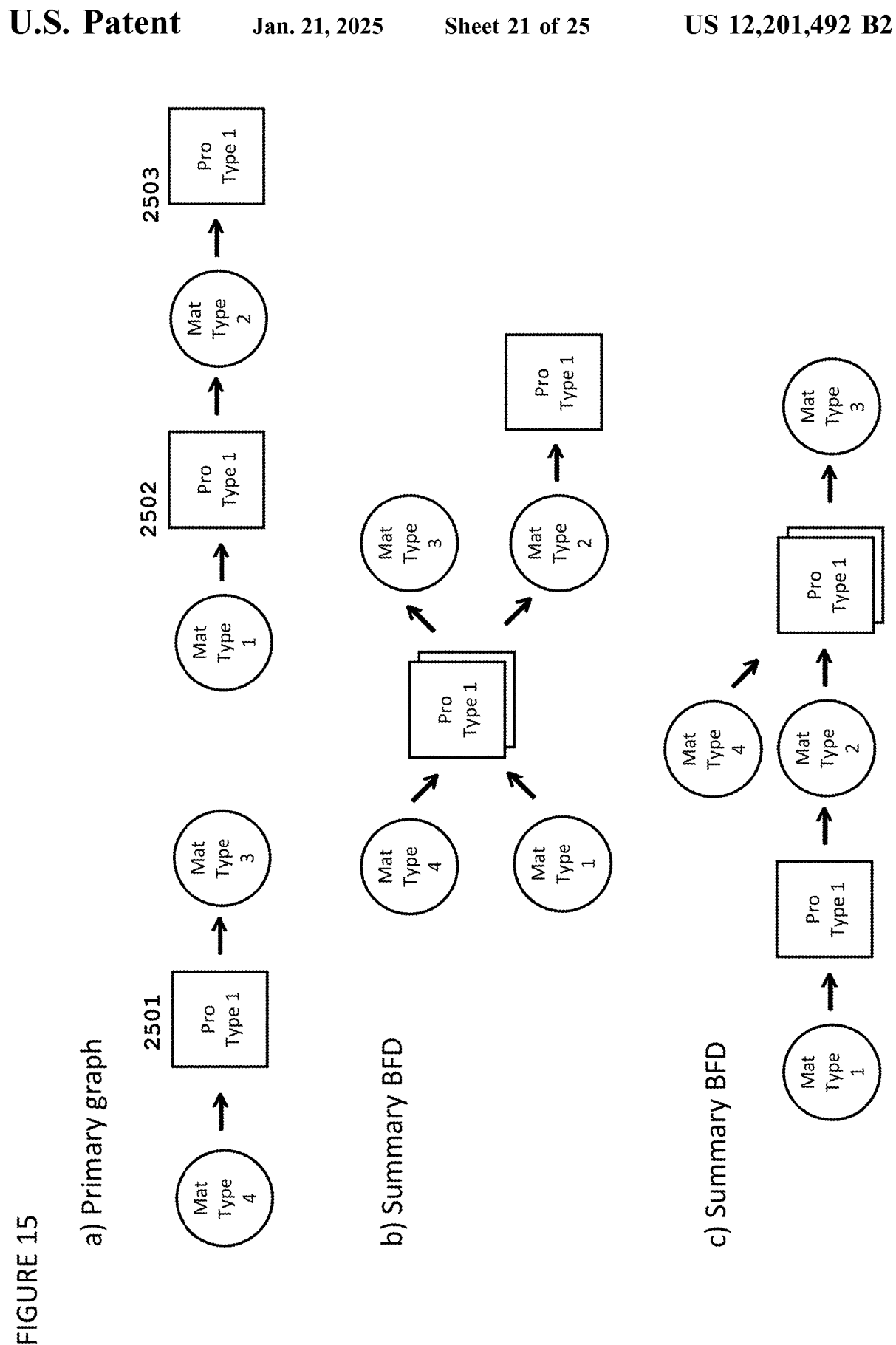
FIG. 15 illustrates a primary graph and two example representative summary BFDs according to the example implementations.

FIG. 15 illustrates a primary graph and two example representative summary BFDs according to the example implementations. The node classifications, referred to as "type", are labeled in the nodes. Nodes which connect to a designated node through a path of edges as destination node are referred to as "upstream" nodes, and nodes which the designated node connect to through a path of edges as a source node are referred to as "downstream" nodes.

At (a) note that for the primary graph, there are branches which may describe the complete paths through each of the subgraphs of the primary graph. However, there are two nodes of the same type "Pro Type 1" in only one of the subgraph branches. The other subgraph branch has one node of the same type "Pro Type 1"

At (b) in this summary BFD representation, two "Pro Type 1" nodes are represented by a single block, which is notated with a "stack" of two squares to show that it represents two nodes of the primary graph. The single "Pro Type 1" node of one subgraph branch is consolidated with one of the two "Pro Type 1" nodes of the other subgraph branch.

At (c) in this summary BFD representation, it is the other "Pro Type 1" node of the subgraph branch that is used for consolidation. The choice of which nodes to consolidate can be made via any logic, and any choice results in a valid summary BFD.

Figure 16:
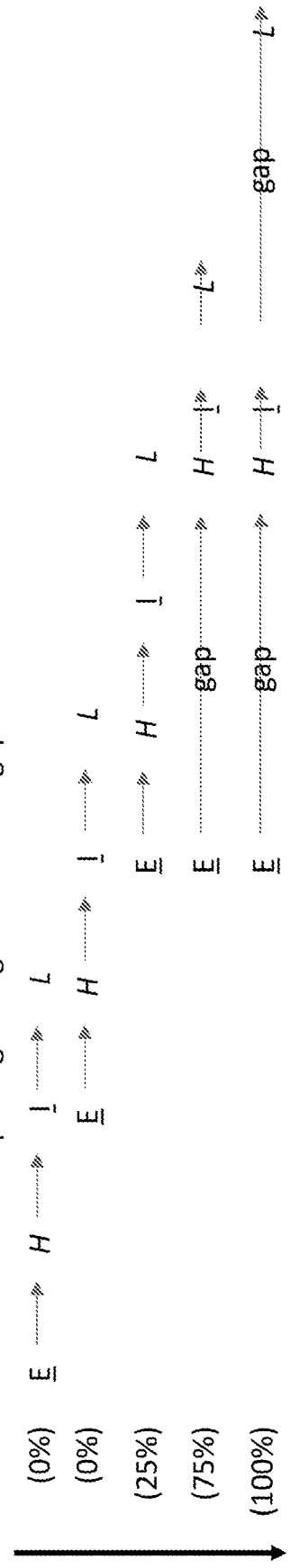
FIG. 16 illustrates an iterative calculation of overlap for a given ordered sequence against a reference ordered sequence according to the example implementations.

FIG. 16 illustrates an iterative calculation of overlap for a given ordered sequence against a reference ordered sequence according to the example implementations. In this example, the reference ordered sequence is given as a sequence from A to L. The given ordered sequence (E, H, I, L) is then matched against the reference sequence. Example iterative calculations are shown, with the percentage of overlap on the left of each iteration. The matching algorithm may be any algorithm which allows gaps, for example, a sequence alignment algorithm may be used. The alignment algorithm may be stopped once any solution is able to produce a gapped alignment of the given sequence to the reference sequence with 100% overlap of the given ordered sequence elements.

Figure 17:
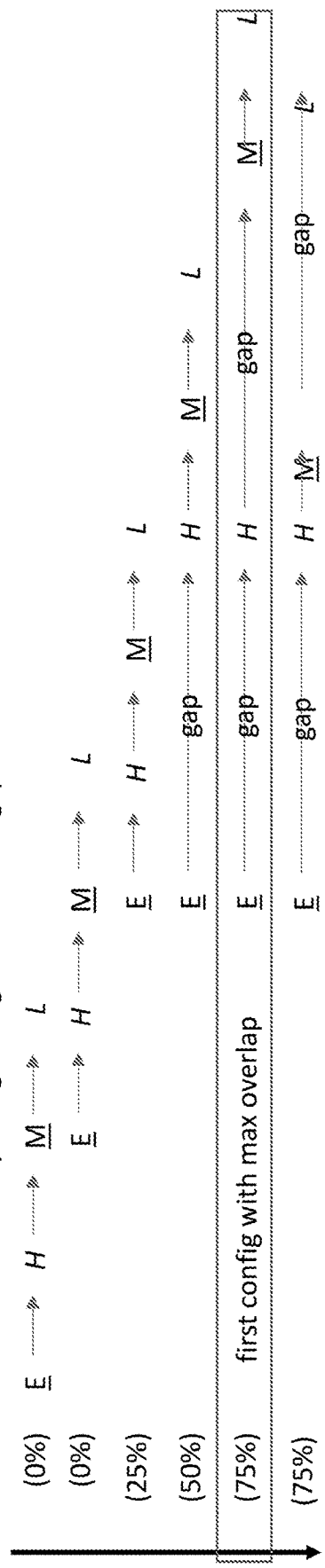
FIG. 17 illustrates an iterative calculation of overlap for a given ordered sequence against a reference ordered sequence according to the example implementations.

FIG. 17 illustrates an iterative calculation of overlap for a given ordered sequence against a reference ordered sequence according to the example implementations. In this example, the reference ordered sequence is given as a sequence from A to L. The given ordered sequence (E, H, M, L) is then matched against the reference sequence. Example iterative calculations are shown, with the percentage of overlap on the left of each iteration. The matching algorithm may be any algorithm which allows gaps, for example, a sequence alignment algorithm may be used. In this example, no solution exists for which a gapped alignment of the given sequence to the reference sequence has 100% overlap of the given ordered sequence elements. In this case, a solution with the highest overlap percentage may be taken as the best possible solution.

The following Examples provide further representative implementations of the presently disclosed example implementations.

An example software system to improve data capture is described here, which uses the data input innovation described above to manage data pertaining to industrial research, development, and manufacturing settings.

An example of the data submitted to the system shown in this example implementation and how it may be processed is shown in FIG. 1. The data to be processed 1001 may be submitted in various formats, such as multiple files, a single file concatenation, data streams, data messages, or through any other method of digital data transfer. The data to be processed may be parsed by the system into two sets, the first set 1002 referred to as "input data" and the second set 1003 referred to as "program data".

The input data make up a first set of data comprising a plurality of values. These values may be formatted in any way, such as in a table, a set of data series, a schema-based format, or any other format such that the subsets of values for processing may be distinguished from each other. The program data 1003 may also be formatted in any way, such as in a table, a set of data series, a schema-based format, or any other format such that the subsets of values for processing may be distinguished from each other. In the example implementation shown in FIG. 1, the input data values are shown as a data table 1002 comprising of headers 1004 and rows of values 1005. The program data are shown as a table comprising rows of values 1006.

The subsets of values of the program data 1003 may describe a set of instructions, referred to as "directives". A directive may describe records to be created or edited (e.g., 1019), records to associate with other records (any records from of 1008, 1009, and 1019), records to retrieve (any records from 1008 and 1009) from a storage system 1010, records to delete (any records from 1008 and 1009) from a storage system 1010, or any combination thereof. The subsets of program data values may also refer to specific subsets of the input data values 1002, or may be used directly via interpretation by the system. For example, in some example implementations, the program data values may refer to the header of a subset of the input data, a particular series of data of the input data, or a particular section of the data based on its schema. In some example implementations, the program values may be used as a valid subset of input data values directly. In other example implementations, the program values may be interpreted to refer to input data values if a valid reference may be made, otherwise the program values may be used as input values directly.

The subsets of input data values may then be processed, either serially or in parallel, to create, update, associate, delete, and retrieve records as directed by the input values, in conjunction with the directive values. In some example implementations, a subset of the input data values may cause more than one of the mentioned record actions to occur. For example, a set of values could direct the system to retrieve none, a single, or plurality of records, create none, a single, or plurality of records, delete none, a single, or plurality of records, and then make none, a single, or plurality of associations amongst any combination of records, not limited to those just created or retrieved. Note that one subset of program values may cause many subsets of input data values to be processed, resulting in a single or plurality (such as 2, 5, 10, 100, 1000, 10000, or more) of records to be retrieved, created, updated, associated, or any combination thereof.

As an example, in the example implementation shown, a row of the program data values 1017 is a subset of the program data values called a directive. Some of the program data values 1003, in this example those in the column 1011, may refer to the input data values 1002 and direct the system to identify records, in this example based on the columns of values with the given headers. Another subset of the program data values 1003, in this example those in the column 1012, may direct the system to create records of certain classifications as well as associations between the created records (e.g., 1007, 1014 and 1015) or between retrieved records 1009 or between combinations of created and retrieved records. Another subset of the program data values 1003, in this example those in the column 1013, may direct the system to associate related records (from the existing records 1008 and 1009) to any created records. Other subsets of the program data values, not shown in this example, may direct the system to perform any actions already mentioned or any previously mentioned combination of actions on records. The records created by this particular example row of program data values 1017 and one subset of input data values, shown in this example as the row 1016, is shown as the records 1019. Note that in this example implementation the subset of input data values 1016 may be preceded or succeeded by other subset input data values in the values 1005, which may be processed until the subset of input data values referred to by the subset of program data values 1017 is completed.

It can be appreciated that in the example implementation shown that each subset of the program data values may refer to a separate subset of the input data values, or may not refer to any subsets. Thus, in aggregate over all of the subsets of the program data values, they may refer to none of the input data value subsets, some of the subsets, all of the subsets, overlapping subsets of the values, the same subset of the values more than one time, or any combination thereof.

It can also be appreciated, that in the example implementation shown, that there is great flexibility in the data input system with regards to the formatting of the input data values. For example, in this example where the input data values 1002 form a table with columns denoted by headers 1004, it is unimportant for the table to be organized with any particular header in any particular sequence. The program data values may be given in such a way that the required subset of values is used, for example in this case, simply be denoting the proper value of the header for the column of values required.

In this example implementation, the records which are created, updated, and associated are then written to the system for storage with a storage system 1010. Any storage system one skilled in the art may use, for example, such as data tables, structured databases, key-value stores, or any other alternative, is suitable, as long as the system may retrieve representations of the records stored in the system with any kind of identifier (for example, in a database, a database ID) which may be represented as values in the input data values.

An example of the workflow for the data input processing system is shown in FIGS. 2A-2B. The data input platform receives the data submission as shown in FIG. 2A at (a). The system may receive the input data and program data in separate data transfers or a single transfer. As long as the data received is in a format specified by the platform, the input data 1201 and program data 1202 may be distinguished from each other. The system may then process the set of instructions in the program data. Each directive is processed, and each directive may refer to none of the input data, a single subset of the input data values, or a plurality of subsets of the input data values. As described in FIG. 1, records are constructed, updated, associated, deleted, or any combination thereof based on each set of values in the input data values and the directive values. As shown in FIG. 2B at (c), the records may then be stored and written into the storage system associated with the platform. The pattern of processing a directive and storing the results is shown in FIG. 2B as 1203 and 1204.

The directives may be processed serially, in parallel, or in any combination thereof in some example implementations. The cycle shown in 1203 and 1204 illustrates serial processing, and may not be accurate for full parallel processing or partial parallel processing. In addition, in some example implementations the storage of the records may not occur in correspondence with the directives. In some example implementations, the records may not be stored until all of the directives are processed, the record storage and directive processing may be asynchronous (for example if storage is batched based on the number of records rather than linked to the completion of any particular directive), the storage may be based on some other parameters, or any combination thereof.

The data processing system may generate feedback data, with an example implementation shown in FIG. 2B at (d). The generated feedback data 1210 may include no information, information about the success or failure of the processing of individual data values, information about the success or failure of the processing of the data processed, more comprehensive information about the outcomes of the processing, detailed information about individual values or records, other information, or any combination thereof. The generated feedback may be stored by the system or discarded. It may be returned to the initiator of the data submission, transmitted to another party or other parties designated in the data to be processed, transmitted to other parties known to the system, or any combination thereof. The feedback data may be transmitted as it is generated, transmitted in batches during the generation, or collected until processing is finished and then transmitted. The feedback may be transmitted in any format and to any recipient via any designation available to one skilled in the art of digital communication. For example, the feedback data may be transmitted as data files, data streams, or any other method. The recipients may be designated by any format, for example, such as email addresses, IP addresses, application programming interface (API) endpoints, remote procedure calls, or any other method that may be part of the system or part of another system.

In some example implementations, the data processing system may handle values in the input data, in the program data, or both, in a variety of ways. For example, the system may encounter input data values which do not conform to the expectations of the processing, such as empty values, values which do not refer to valid records in the system, values which do refer to existing records in the system, values of unexpected type (e.g. strings instead of numbers, or numbers instead of strings), or other types of malformed values. In such cases, the system may ignore such values or halt when encountering such values, and may choose to write or discard changes to the system if such values are encountered. The system may choose different responses any time during the processing of any subset of the program data values or input data values or after all of the processing has been completed. In some example implementations, the system may update the feedback data generated with information about the encountered values and the resultant outcomes.

An example of a "permissive" system is shown in FIG. 3A. In this particular example implementation, the program data values 1303 refer to input data values 1302 which refer to unique records in the system. If an input data value is empty or missing, no record with an identifier is created, otherwise a record with the given value as identifier is created. For the subset of program data values in the data processing event 1305, a total of four records are created and two subsets of the input data values are ignored. This is depicted in an example feedback data 1306, where a table is shown breaking down the results of each subset of the program data values. Four records are created and two subsets of input data values are marked with "missing" in 1307. For subsequent subsets of the program data values in this example, the input data values do not include empty values, and the system creates six records for each, as shown in 1308 and 1309.

An illustration of the ease of use of this "permissive" system is shown in FIG. 3B at (b), depicting a subsequent data processing event for this example implementation. In this case, the included input data values 1371 are similar to the previous ones 1302, except there are two extra rows (subsets) 1361 of the input data values and that one of the previously empty values 1362 is not empty. One possible source for this second set of input values is that a user added extra values and amended the missing value to the first set of input data values. It can be appreciated that this may be the result of a user using the feedback data from the first event to fix the empty value and meanwhile extra data was acquired in the course of the work of the user. However, the provenance of the second set of input values is not important to the processing of the values by the system.

In this example, note that the program data 1370 of the second submission is exactly the same as the program data of the first submission 1303. The data input platform does not require changes to the program data values and encourages the usage of the same program data values for different submissions where the input data values are to be processed in a similar manner.

Here, the first subset of the program data values 1363 of the second data processing results in the creation of three records (one corresponding to the input value 1362 and two for the subsets of the input data values 1361). Five subsets of the input data values were ignored, four subsets because the values referred to existing records, and one because the value was missing. In this example, the feedback data shown 1366 illustrates the outcome described. Subsequent program data subsets result in the creation of records as expected based on the input data values of this example, as shown in feedback data 1367 and 1368. Note the difference in the results between the second subset and third subset of the program data values due to the missing input data value of the last row 1369 in this example.

A number of observations can be made about the effects of such a system. It can be appreciated that such a permissive system will allow records to be written to the system without duplication, even if some subsets of the input data values are submitted for processing more than one time. It can also be appreciated that as a result, a user does not need to worry about whether any data has already been processed and may re-submit the same data any time. In addition, a user may submit data to be processed in the course of their work without the input data values being complete. In an industrial setting, for example, users may submit data to the system at checkpoints or ends of shifts, signifying the current state of work, which may then be picked up by other users or the same user at any subsequent point in time, with the same input data values used as a starting point for subsequent data processing. All of the permissiveness of this example implementation removes the burden for users submitting data to the platform to be cognizant of the state of the existing data in the system, reducing any barriers to data entry, and increasing the likelihood that data will be submitted and captured by the system.

In other example implementations, the data processing system may be used for data migration, meaning that a single or plurality of records may be retrieved, created, updated, associated, or any combination thereof to achieve a desired state of records in the system. Some non-limiting example types of possible data migrations include the updating of records to more closely reflect the work of the user, the update or correction of associated values in the system, or to split a set of records into multiple sets of records. It can be appreciated that data migrations in systems with predetermined workflows are substantially more difficult when the migration introduces changes to the wiring of the steps.

An example illustration of a possible data migration is shown in FIG. 4. The state of the data input platform is illustrated via storage system 1401, depicting 6 records shown as three sets of two records each in an ordered manner. A desired state of the system is shown in 1402, depicting three sets of records in an ordered manner. One set of records is the same as in the current state (comprising two associated records) and is not changed from the migration. Two sets of records now consist of four records each, where the two original records are now at the ends of the ordered set of four records (with the two new records introduced "in between", meaning the associations of the records are such that the first previous record is associated to the second previous record through associations of the introduced records). A possible interpretation of this migration is, if the records represent samples going through steps of a workflow, that part of the data of records created from one workflow has been updated to reflect that some of the samples in the workflow went through extra steps. However, the provenance of the update to the records in the data migration is unimportant to illustrate how the migration is accomplished.

It can be appreciated that the method of migration shown in FIG. 4 is not the only method through which the migration may be accomplished, but that the migration may be accomplished relatively easily with the method shown. For example, because the migration shown relies on submitting data to the data input platform just like any other data submission, the user needs only to learn the mechanics for submitting data to the platform to accomplish both data capture and data migration.

The first step of the shown migration is to export data as shown in 1403, in any format which may be used by the data processing system as input values. The user may then adjust the input data values as needed, if at all, to effect the desired migration. In this example, the user may add subsets of the input data values to depict the records to be created. The subsets of the input data values to depict the records to be created may themselves come from an export of different records from the data input platform. The user then pairs the input data values with program data values 1404, which as in other example implementations described above, contains the necessary information to retrieve, create, update, delete, and associate any of the records for the desired final state of the system. The program data 1404 may be similar to the program data that created the records shown in 1401 and adjusted accordingly, or the program data may be from any other provenance. The data for processing 1405 is then submitted to the system, resulting in the desired data migration.

The data that are exported for the data migration do not have to correspond at all to how the data records were written into the system in the first place. The data migration may span large amounts of data covering many previous data submissions, a task which would be very time consuming if restricted otherwise. In addition, enabling such a wide view of the data encourages more routine use of migration to update data. For example, in scientific research, it is often the case that experimental understanding shifts while the data is collected over a sequence of multiple experiments. In other systems, previous data captured with an outdated model of the data are not easily migrated and that data may be lost for future analysis. With a platform where data migration is easy, the previous data may be re-cast given the newer understanding and model of the data, such that the previous results have a longer lifespan in analysis. In some example implementations of the data input platform, some of the records created, updated, or associated by the system may be used to extract graph data. As shown in FIG. 1, the records created by the data input platform 1019 may have associations with other records. As illustrated with the arrows between the example records 1007, 1014, and 1015, some of these associations may be used as edges of a graph where the records serve as the nodes. The extracted information from the records which provides for a list of nodes and edges to be constructed may be referred to as the "graph data".

The associations between records may be directional, in that there is an ordering to how the records are associated, such that one record maybe designated a "source" record and the other record a "destination" record. Note that "source" and "destination" may not refer to any physical properties, but merely to the ordering of the association. In such a case, the edges connecting the nodes represented by the records are directional, and the result is a directed graph. In some cases, the graph data may have distinct subsets of nodes interconnected only to other distinct subsets of nodes, and the graph may be a k-partite graph, where k is the number of distinct subsets. When k=2, the graph is a bipartite graph. When the graph data has ordered edges and is also a k-partite graph, the graph is a k-partite directed graph, and when k=2, the graph is a directed bipartite graph.

Other associations of the records or other inherent values or properties of the records may be extracted and included with the graph data. These parameters and their values, while not necessary for the graph construction, may be used for the summary Block Flow Diagrams innovation described below.

Example Implementations of Summary Block Flow Diagrams

Given a set of graph data which represents a graph referred to as a "primary graph", a set of graphs is defined which also represent the given primary graph with certain constraints. In the descriptions below, the primary graph's nodes are referred to as primary nodes and the primary graph's edges are referred to as primary edges. It can be appreciated that the source of the graph data may be from the data input platform, another source, or any combination thereof.

By leveraging associated parameters corresponding to the primary nodes, primary edges, or a combination thereof, a representation may be made where each summary graph element has the same values of chosen associated parameters. To distinguish this new graph representation from the original, the nodes of the created graph are referred to as "blocks" and the new representation is referred to as a summary Block Flow Diagram (BFD). There may be representative graphs which represent the primary graph, but where each graph element does not represent only one set of values of the chosen associated parameters, but these are not block flow diagrams as defined above.

A key feature of summary BFDs is that when such parameters are used, each block may represent one or multiple primary nodes, and each edge may represent one or multiple primary edges. By deciding which parameters of the primary nodes or primary edges to use as input for the summary BFD generation, different summary BFD graphs representing the same primary graph may be generated. Each of these visualizations may highlight differences or similarities between or among elements of the underlying primary graph, allowing significant features of the primary graph to be identified, even if the primary graph consists of hundreds, thousands, or even more primary nodes or edges.

In certain cases, such as where no parameters of the primary nodes and primary edges exist to generate the summary BFD, where all of the parameters are of different values, or where there are no parameters chosen, a valid summary BFD is simply the same graph as the primary graph. However, while these cases exist, the example implementations are directed to cases where the summary BFD is different from the primary graph.

An example of a primary graph is shown in FIGS. 5A-5B. Each primary node is a shape as shown in the example elements 1501, 1502, 1503, and 1504. Each node may be represented by a shape, where the shape of the node is used to indicate the classification each node. Note that the classification of each node may refer to the value of a single parameter or the combination of values of a plurality of parameters. In a similar manner, each edge is indicated by the example elements 1505 and 1506, where the type of line used to indicate the edge is used to indicate the classification of each edge. Note that the classification of each edge may refer to the value of a single parameter or the combination of values of a plurality of parameters. Also, note that the primary graph includes subsets of nodes and edges which are disconnected from other subsets of nodes and edges; there is no constraint for any of the nodes to be connected to any other nodes.

In the example shown, the primary graph consists of 15 nodes and 10 edges, with a total of 4 node classifications and 2 edge classifications. It can be appreciated that, as the number of nodes, edges, node classifications, and edge classifications increases, the primary graph visualization may quickly become difficult for a viewer of such a primary graph to compute even basic metrics of the graph such as the counts of nodes, edges, node classifications, and edge classifications. More complex metrics, patterns, and features of the underlying graph may be even harder to determine than the basic metrics, especially as the graph size increases.

A possible summary BFD for the primary graph of FIG. 5A at (a) is shown in FIG. 5A at (b). In this example, there are 5 blocks and 4 edges, with a total of 5 block classifications and 2 edge classifications. Block 1511 represents the primary node 1501, and edge 1516 represents the primary edge connection of that primary node. Similarly, block 1512 represents the multiple primary nodes of the classification of node 1502, and edge 1517 represents the multiple edges 1506, 1521, and 1522. In a similar manner, the blocks 1513, 1514, and 1515 represent the nodes of classification 1503, the nodes of classification of 1501 except for node 1501 itself, and the node of classification 1504 respectively. Each of the edges 1517, 1518, and 1519 represent the multiple primary edges connecting the primary nodes which the blocks 1513, 1514, and 1515 (respectively) represent to the primary nodes of classification 1502.

A summary BFD must be a valid representation of the primary graph, which is defined to mean it must satisfy the following conditions. The number of primary nodes must equal the sum of the number of nodes each block represents over all of the blocks in the summary BFD. For each primary edge, there must be a summary BFD edge which has the same parameters for the edge itself and the parameters for the nodes which it connects. In addition, in such an accounting, for every pair of primary node classification and primary edge classification, the number of summary BFD edges weighted by the smaller of the number of nodes the blocks it connects represents, must match the number of primary edges. For example, in FIG. 5A at (b), there is one edge 1516 for primary node classification 1501 and primary edge classification 1505. Thus, there is one and only one summary BFD edge 1516 which may be present in the summary BFD, represented by connecting a block 1511 representing one primary node 1501 and a block representing five primary nodes 1512, which then accounts for one summary BFD edge (the lesser of one and five).

In a similar manner, the edges connecting to block 1502 represent a total of four primary edge groups: 1516 representing one primary edge (as just discussed), 1518 representing 4 primary edges, 1517 representing 3 primary edges, and 1519 representing 2 primary edges. The edge 1518, connects to blocks representing 4 and 5 primary nodes. Therefore, it accounts for 4 primary edges (the smaller number), which matches the 4 primary edges 1523. Resolving the other edges of the summary BFD similarly, it can be seen that the summary BFD accounts for all of the primary edges of the primary graph exactly. Thus, this graph is a valid representation of the primary graph, and may be referred to as a summary BFD.

With the reduced number of blocks (compared to the number of primary nodes), it is easy to quickly understand the relationships of the primary graph. For example, the blocks 1514 and 1512, with the connecting edge 1518, illustrate that four of the node-edge-node relationships in the primary graph are of node classification 1501 to node classification 1502 with connecting primary edges 1523. If the primary graph consisted of many more nodes and edges with this topology, all of them may be presented by the same blocks and edges without any change to the summary BFD. While the illustrated blocks represent multiple primary nodes as "stacks" of nodes in this figure, it can be appreciated that any block may be easily labeled with a number representing the count of primary nodes it represents, if such a label is convenient for the user.

The example summary BFD shown in FIG. 5A at (b), by casual inspection, is also the summary BFD for the primary graph of FIG. 5A at (a) with the least number of blocks and edges. Thus, a metric may be defined, which measures the "reduction" of a summary BFD by comparing its number of blocks against the number of primary nodes. Another valid summary BFD representing the primary graph is shown in FIG. 5B at (c). This summary BFD has less "reduction" than the one shown in FIG. 5A at (b), but is equally valid. It may also be easier to see the outlier edge 1528 and its relationship to its connected blocks in this visualization.

It can be appreciated that given a wide variety of primary graphs, the resulting reduction in the number of blocks compared to the number of primary nodes can also be a wide range. In the limit of maximum reduction, a summary BFD may consist of a single block, representing all of the primary nodes of the primary graph (which has no primary edges). In general, any algorithm for any example implementation that generates summary BFDs will likely strive to reach higher "reduction", as the "reduction" is a key reason the summary BFDs may be useful. However, in any specific use case, there may be a preference for summary BFDs with intermediate levels of reduction. Thus in some example implementations, algorithms chosen to generate summary BFDs may optimize for lower levels of reduction.

In some example implementations, the primary graph is a directed graph, where the edges are an ordered pair of primary nodes. In such a directed graph, the edges may be represented as arrows, where the tail and head of the arrow are used to represent the first ("source") and second ("destination") primary nodes, respectively, which the primary edge connects. FIG. 6A at (a) shows an example of a directed primary graph. An inspection of FIG. 6A at (a) in comparison with the previous FIG. 5A at (a) will show that the nodes and their classifications are identical. In addition, the edges are identical in node distribution, except the edges, due to their directed nature, have a polarity to the nodes that they connect, indicated by the tail and head of the arrows used.

In related art directed graphs, the directions of the edges are aligned to generally point in a similar direction. Such an aligned primary graph, as shown in FIG. 6A at (b), may be useful in cases where the graph is a representation of states (nodes) and transformations (edges) which have a source (tail of edge arrow) and destination (head of edge arrow). Examples include changes to states in time, or conversions of one kind of object to another kind of object. Note that in FIG. 6A at (b), to align the direction of the edges, the nodes of the graph are no longer in the same positions as in FIG. 6A at (a).

The introduction of the directed nature of the primary graph may have a significant impact to summary BFDs which represent the primary graph. FIG. 6B at (c) shows a possible summary BFD for the equivalent primary graphs shown in FIG. 6A at (a) and (b). Note that the accounting for the validity of the summary BFD to represent the underlying primary graph must be amended to include the matching of the directions of the edges. That is to say that instead of merely matching the classifications of the primary nodes for a primary edge, the classifications must match on the basis of the ordered pair of node classifications which that primary edge connects. For example, in accounting for the block 1655, it can be appreciated that the block is the source block for edges 1665, 1666, and 1667. Each of those edges must match the correct number of primary edges with the same source primary node classification, primary edge classification, and destination primary node classification.

It can be appreciated that other valid summary BFDs may be generated by adding other considerations or constraints to the algorithm that generates the summary BFD. For example, FIG. 6B at (d) is also a valid summary BFD representation of FIG. 6A at (a) and (b). On inspection, this summary BFD is an intermediate level of reduction when compared with FIG. 6B at (c), as it has two more blocks and one more edge. The summary BFD shown in this example may be generated by additional constraint to the classification of a primary node.

For example, consider a possible algorithm that constructs the summary BFD in sequence, and that graph elements 1681, 1682, 1691, 1693, 1683, 1693, 1694, 1684, 1685 are already part of the summary BFD in construction. Now, consider the primary edge 1609, which in FIG. 6B at (c) is represented as 1663. If a constraint is added, where each primary edge may only be combined with other primary edges where their source node classification and destination node classification match, the primary edge 1609 may not be added onto block 1683; the source node 1610 is not of the same classification as the blocks 1681 and 1682. That is to say, block 1683 represents all blocks of that classification which are the destination of blocks of the primary node classification 1601. Therefore, a new block 1688 is added to the summary BFD, which represents all blocks of the same classification but which are the destination of blocks of the node classification 1686. Blocks 1689 and 1687 are constructed similarly. However, note that the block 1690 represents two primary nodes which satisfy the additional constraint, because both source blocks represent a source node of the same classification 1601, even if those nodes must be represented in separate blocks.

As illustrated, there may be many algorithms with additional constraints to generate summary BFDs which may exclude some other valid summary BFDs that fail those constraints. It can be appreciated that the summary BFD shown in FIG. 6B at (d) has two disconnected subgraphs due to the directed nature of the edges. While this is an intermediate representation summary BFD when considering only the constraints to construct valid summary BFDs, it may represent a minimal representation summary BFD when considering a superset of those constraints. It is important to note, however, that the algorithm for a superset of the constraints will result in a valid summary BFD representation, and thus is an algorithm that will satisfy the minimum required constraints. In some example implementations, summary BFDs may be considered for generation depending on the minimal required constraints, supersets of the required constraints, or combinations thereof, as submitted to the system generating the summary BFDs.

In some example implementations, the primary graph data may represent a bipartite graph, where one subset of node classifications is connected to a non-overlapping subset of node classifications. FIG. 7A at (a) depicts a bipartite graph, where the letters noted in the primary nodes represent the node classification. The primary nodes of classifications A, D, F, and G are only connected to nodes of classifications B, C, and E (and vice versa). The shape of the primary nodes is used here to represent these two subsets of node classifications and reinforce that the nodes satisfy the criteria for a bipartite graph.

Shown in FIG. 7B at (b) is a valid summary BFD representation of FIG. 7A at (a). Because the primary graph is a bipartite graph, in addition to the minimal rules for a valid summary BFD representation of a primary graph, the summary BFD must also be a bipartite graph. More specifically, the classification of a block must fall into one of the non-overlapping subsets of node classifications, and must only be connected through its edges to blocks of the other subset of node classifications.

It can be appreciated that the primary bipartite graph in FIG. 7A at (a) may actually be represented, through a transformation, to the non-bipartite graph shown in FIG. 5A at (a). For example, FIG. 7B at (c) shows the transformations (replacements) required to make the representation. For example, the primary node 1701 and its primary edge 1702 in FIG. 7A at (a) may be represented by a node similar to the node 1501 of FIG. 5A at (a). By applying all of the transformations, the resultant transformed primary graph looks topologically equivalent to FIG. 5A at (a).

It can be appreciated that such a transformation may make the calculations of finding a valid summary BFD for the bipartite primary graph simpler. The transformed graph has fewer nodes and edges, and by not being bipartite, does not require the extra rules of a bipartite graph. Thus, it may be much faster to find the valid summary BFD for the transformed graph. A reverse transform may then be applied to recover an approximate valid summary BFD for the bipartite primary graph, which may then be adjusted to make the final summary BFD.

It can be appreciated that while the above description is for a bipartite graph, that in some example implementations, the primary graph data may describe a multi-partite graph of k partitions (or k-partite graph). The handling of the primary graph data, algorithm for summary BFD generation, and final construction of the summary BFD graph may be generalized appropriately by one skilled in the field for a k-partite graph where k is an integer greater than 2.

In some example implementations, the primary graph is a directed bipartite graph. An example is shown in FIG. 8A at (a), where the edges have their direction represented with arrows. Construction of valid summary BFDs has all the same requirements of a valid summary BFD for bipartite graphs, and an additional requirement due to the direction of the edges. The amendment includes the matching of the block edges on the basis of the ordered pair of node classifications that a primary edge connects for each primary edge. It can be appreciated that the rules for matching a directed bipartite graph may be generalized appropriately by one skilled in the field to rules governing the construction of summary BFDs for directed k-partite graphs, where k is an integer greater than 2.

FIG. 8B at (b) shows a valid summary BFD for the directed bipartite graph in FIG. 8A at (a). As previously discussed, a superset of the minimum required rules for constructing a valid summary BFD may be used to create other valid summary BFDs. FIG. 8B at (c) shows another valid summary BFD for the same directed bipartite graph of FIG. 8A at (a), with requirements for each block edge to match on the source block classification. It can be appreciated that the algorithm for this superset of rules will produce a valid summary BFD.

In some example implementations, the primary graph nodes may represent physical materials and the processes which may act on a subset of those materials, create a subset of those materials, or combinations thereof. The primary graph may comprise a bipartite directed graph, wherein a material to process association designates an input material to a child process and a process to material association designates a parent process to an output material.

It can be appreciated that such a bipartite graph may also be represented as non-bipartite graphs, where intervening nodes of one subset and the edges to those nodes may be represented by new classifications of edges. For example, a transformed graph of material to material associations may be created of material nodes only. Each intervening process, its source edge, and its destination edge, is replaced by a classification of transformed edges, representing the distinct process and edges replaced. Similarly, a transformed graph of process to process associations may be created. These representations may be useful in algorithms to create valid summary BFDs of the underlying primary graph, to create valid summary BFDs of the transformed graphs, or may be useful in their own right as representations of interest.

In some example implementations, the system may generate the summary BFD data without display of a visual representation. In other example implementations, a visual representation may be generated for future usage, or a visual representation may be presented via a user interface. In other example implementations, the primary graph data is generated from a data input system as described above in this disclosure, or the primary graph data may be submitted to the system from a separate source.

There are many possible algorithms for constructing valid summary BFDs. It is possible an algorithm may draw from the related computer science Shortest Common Supersequence (SCS) problem or from the related problem of sequence alignment in biology. However, the existing SCS problem and sequence alignment problems are fundamentally different from the problem of finding suitable Block Flow Diagrams, as explained above.

In both the SCS and sequence alignment problems, there is no branching of sequences similar to the branching illustrated in some of the primary graph figures above, making it non-obvious how to repurpose or extend them to this usage. In addition, there are two other main limitations to re-purposing such sequence alignment algorithms for reducing primary graphs to summary BFDs. Firstly, these algorithms take as input a readily prioritized reference sequence, which the read sequences are then compared against. Secondly, they may rely on a fixed "alphabet", defined as the number of types of elements in the input sequences, such as four bases for DNA or 20 amino acids for protein sequences. For primary graphs and their summary BFDs, there is theoretically no limit to the size of the set for any chosen parameter(s) for which a summary BFD must be generated.

A representative specific algorithm to generate specific summary BFDs for bipartite directed graphs is described below. As previously stated, as it represents a superset of the minimum rules for valid summary BFDs, the algorithm may be used to provide valid summary BFDs from less constrained primary graph data, simply by generalizing or relaxing some of its rules. Similarly, there may be other rule supersets of interest, which may generate specific valid summary BFDs for alternative use cases. It is important to note that while the representative specific algorithm is intended to describe a complete summary BFD construction method, there may be a multiple of summary BFD solutions which satisfy its constraints, and any of them are valid.

For the example below, the primary nodes and edges may represent states and transformations, such as materials and processes, and for simplicity, will be referred to as materials and processes for the two subsets of node classifications. For simplicity, a default parameter for node classification, the "type" of process and "type" of material, will be used in the example. It can be appreciated that the following description does not limit the algorithm to using a singular parameter, and that the singular parameter may be easily generalized to be the representation of a combination of multiple parameters.

To implement the representative algorithm, it is useful to introduce the term "branch", which refers to any sequence of two or more connected nodes. For example, a branch could connect any two materials through one or more processes (and intermediary materials), or two processes through one or more materials (and intermediary processes). In this example, a particular branch defined by (a) a particular upstream material (or upstream process) node, (b) a particular downstream material (or downstream process) node, and (c) its particular sequence of intermediary midstream material (or midstream process) nodes is said to have a "distance" or "length" equal to 2*N if there is a sequence of N process (or material) records explicitly or implicitly intermediating the upstream and downstream materials (or processes).

The following description categorizes various cases corresponding to arrangements of one or more blocks based on their parameter values, using the default "Type" parameter. For each case, a rule or outcome is prescribed. In this example implementation algorithm, a table of branches, as defined above, is generated based on the primary graph of material and process nodes. Before describing the algorithm, it is useful to consider a set of 8 archetypal cases which will be used in the algorithm for consolidation of primary nodes and primary edges into blocks and edges of the summary BFD.

Case 1: Multiple nodes of the same material or process Type are connected by a branch.

Rule 1: Each connected node of the same Type should appear in the summary BFD represented by different blocks. For example, FIG. 9 shows a primary graph, with the Type of each node labeled. The two connected nodes of "Pro Type 1" 1901 and 1902 will not be grouped together in the same block despite sharing the same Type.

Case 2: Multiple nodes of the same Type are not connected by a branch, and also have no upstream or downstream Types in common. For example, in FIG. 10 at (a), the primary nodes 2001 and 2002 of process type "Pro Type 1" satisfy these conditions. The edges to these two nodes connect to nodes 2003, 2004, 2005, and 2006, which are all of different material types.

Rule 2: The nodes sharing the same Type are consolidated into a single block for representation, and all the other upstream and downstream nodes will be in blocks connecting to it in some way. For example, in FIG. 10*b*, the two "Pro Type 1" primary nodes 2001 and 2002 are grouped together into a single block 2010 representing both nodes, as notated with the "stack" representation.

Case 3: Multiple nodes of the same Type are not connected by a branch, and they have only one immediately upstream (or downstream) connected Type in common. For example, in FIG. 11 at (a), the two nodes of type "Pro Type 1" 2101 and 2102 each have an immediately upstream node of type "Mat Type 1", 2103 and 2104 respectively.

Rule 3: Each node sharing the same Type will be consolidated into a block, and the upstream nodes sharing the same Type will be consolidated into another block which will be linked directly to each other; all the other upstream and downstream nodes will be in blocks connecting to them in some way. For example, in FIG. 11*b* both nodes of "Mat Type 1" 2103 and 2104 are represented by the block 2110 (as denoted with the "stack"), and both nodes of "Pro Type 1" 2101 and 2102 are represented by the block 2111 (as notated with the "stack"). The two blocks are connected by a single edge.

Case 4: Multiple nodes of the same Type are not connected by a branch and they have one upstream (or downstream) Type in common at the same distance, where the distance is greater than 1. The distance between two nodes is defined as the (smallest) number of edges which must be traversed between the two nodes. For example, in FIG. 12 at (a), the nodes of type "Pro Type 1" (2201 and 2203) and "Pro Type 2" (2202 and 2204) satisfy this condition, and are of distance 2 apart.

Rule 4: Each subset of nodes of the same Type will be consolidated into a block. In between each block representing a subset of the nodes, there will be different paths of blocks, such that the number of edges is equal to the distance. For example, in FIG. 12 at (b), both nodes of type "Pro Type 1" 2201 and 2203 are grouped together in a block "Pro Type 1" 2210 (notated with a "stack"), and similarly the nodes of "Pro Type 2" 2202 and 2204 are grouped in a block 2211 (notated with a "stack"). There are also two equidistant paths connecting the two blocks, with one intervening block each of type "Mat Type 3" 2212 and "Mat Type 2" 2213. The two edges around the intervening blocks make up the expected distance 2 between the "Pro Type 1" block 2210 and the "Pro Type 2" block 2211.

Case 5: Multiple nodes of the same Type are not connected by a branch and they have one upstream (or downstream) Type in common at different distances. For example, in FIG. 13 at (a), the nodes of type "Pro Type 1" (2301 and 2302) are connected to nodes of "Mat Type 2" at distances of 1 and 3 (2304 and 2303, respectively).

Rule 5: Each subset of nodes with the same Type will be consolidated into a block. The corresponding block will have various intervening blocks which will connect the two blocks at multiple distances. For example, in FIG. 13*b*, both nodes of type "Pro Type 1" 2301 and 2302 are grouped together in a block 2311 (notated with a "stack"), and both nodes of type "Mat Type 2" 2303 and 2304 are grouped together in a block (notated with a "stack"). There is a single edge 2313 connecting the two blocks at distance 1, but there is also a path through the block "Mat Type 3" 2314 and block "Pro Type 2" NNN connecting the two blocks at distance 3.

Case 6: Multiple nodes of the same Type are not connected by a branch and one subset of the nodes is linked to an upstream Type that occurs downstream of another distinct subset of the nodes. For example, the nodes of type "Pro Type 1" 2401 and 2403 satisfy the condition with the two nodes of "Mat Type 1" 2402 and 2404, where 2402 is upstream of 2401 and 2404 is downstream of 2403. However, note also that the situation is symmetric, such that either the "Pro Type 1" or "Mat Type 1" nodes may have priority in Rule 6 below.

Rule 6: One of the subsets of nodes of matching Types will be selected for consolidation into one block. The other distinct subset of nodes corresponding to the other matching Type will not be consolidated. The selection may be arbitrary, randomized, or predetermined (for example, the first in the sequence may be selected as a default). For example, in FIG. 14 at (b) and FIG. 14 at (c), there are two outcome summary BFDs shown based on which subset of nodes ("Pro Type 1" or "Mat Type 1") are consolidated into a block.

Case 7: In comparing two disconnected subgraphs for consolidation, only 1 of the 2 has multiple instances of the same Type in some sequence. For example, in FIG. 15, the two subgraphs of the primary graph, satisfy the condition, where two nodes of type "Pro Type 1" 2501 and 2502 only appear in one of the subgraphs.

Rule 7: One of the two sets of matching Types will be selected for consolidation. The selection can be arbitrary, randomized, or predetermined (for example, the first in the sequence can be selected as a default). For example, in FIG. 15, there are two outcome summary BFDs as shown in FIG. 15 at (b) and FIG. 15 at (c), based on which of the nodes of "Pro Type 1" 2502 and 2503 are used to consolidate with the node of type "Pro Type 1" 2501.

Case 8: Any combinations of the distinct and separable cases 1-7 above. As noted, cases 6 and 7 allow for multiple solutions, and any set of chosen solutions for the combinations of cases suffices.

An example algorithm utilized in some example implementations of the summary BFD generating system may proceed as described by Steps 1-8 below. It can be appreciated that other implementations of a summary BFD generation algorithm may be utilized in other example implementations of the software system. As in the cases above, the example below describes summary blocks of material and process nodes which are differentiated only by their types as a parameter, but the algorithm is easily generalized to a plurality of parameters and their values.

Step 1. Create lists of all the material and process nodes to be summarized. For example, at this step the algorithm may create the list objects hereinafter referred to as "list_loaded_materials" and "list_loaded_processes".

Step 2. Find the subset of list_loaded_materials nodes which has no parent process nodes in list_loaded_processes. For example, at this step this list object may be created and hereinafter referred to as "list_no_parent_processes".

Step 3. Find the subset of list_loaded_materials nodes which does not appear as an input to any process nodes in list_loaded_processes. For example, at this step this list object may be created and hereinafter referred to as "list_no_ child_processes".

Step 4. Isolate the subset of the branches information where the upstream material node is in list_no_parent_processes and the downstream material is in list_no_child_processes, sorting the results by the distance of the branch (descending). For example, at this step the list object may be created and hereinafter referred to as "list_end_to_end_ branches".

Each element of list_end_to_end_branches may be constructed as a tuple of lists: the first element of the tuple is the sequence of process and material nodes, in order from the first parent process node to the last output material node (e.g., [Process node 1, Material node 1, Process node 2, . . . , Material nodeN]). The second element of the tuple is the corresponding sequence of process and material types (e.g., [Fermentation, Whole Cell Broth, Centrifugation, . . . , LC Sample]). The elements in list_end_to_end_ branches are sorted from longer to shorter sequences of "first parent process to last output material."

Step 5. Create three empty lists, one associative array, and one two-dimensional array that will be used as defined and described in Steps 6 through 8 below. For example, these empty list objects may be created and hereinafter referred to as "list_summary_branches", "list_summary_nodes", "list_ summary_node_names".

For example, at this step an empty associative array may be created and hereinafter referred to as "aa_summary_edges". For example, at this step an empty two-dimensional array may be created and hereinafter referred to as "array_summary_branches_node_map".

Step 6. Use the first element of list_end_to_end_branches to write the first records to the three empty lists, the one associative array, and the one two-dimensional array in the following manner:
 a) Write the list of process and material types stored as list_end_to_end_branches[1,2](e.g., [Fermentation, Whole Cell Broth, Centrifugation, . . . , LC Sample]) as the first element of list_summary_branches.
 b) Write the N material_types and N process_types of list_end_to_end_branches[1,2] in order, from the first parent process to the last output material, as the first 2*N elements of list_summary_nodes.
 c) Map the values 1 through 2*N to positions [1,1] through [1,2*N] of array_summary_branches_ node_map.
 d) Insert the process and material nodes corresponding to list_summary_node[1] through list_summary_node [2*N] into 2*N associative arrays stored, in order, as the first 2*N elements of list_summary_node_names.
 e) Write the 2*N−1 edges connecting the 2*N material_ types and process_types of list_end_to_end_branches [1] as the first 2*N−1 keys of aa_summary_edges (e.g., the edge connecting blocks 4 and 5 may be represented as the string "4-5").

Step 7. For every other element, i, of list_end_to_end_ branches, determine if there exists any gapless or gapped configuration of the sequence of material and process types specified by list_end_to_end_branches[i,2] that overlaps 100% with any current element of list_summary_branches. This determination can be made as illustrated in FIG. 16 using a sliding window with gaps, for each current element, j, of list_summary_branches. Additional overlap values need not be calculated after a single configuration of list_end_ to_end_branches[i,2] is determined to overlap 100% with any current element, j, of list_summary_branches. As shown in FIG. 16, the reference sequence is constructed from list_summary_branches through element j, and an iterative calculation of overlap is performed for a given ordered sequence list_end_to_end_branches[i,2].
 a) If the determination at Step 7 is yes (an appropriate configuration exists) for element i of list_end_to_end_ branches, do not create any new blocks, but do attempt to make new summary edges if gaps exist within the 100%-overlapped configuration of list_end_to_end_ branches[i,2] with any list_summary_branches[j], and do track which materials and processes of list_end_ to_end_branches[i,2] can be mapped to which of the blocks that have thus far been catalogued during execution of this algorithm. These outcomes can be achieved in the following manner:
  i. Leave list_summary_branches and list_summary_n- odes alone
  ii. Insert each material or process of list_end_to_end_ branches[i,1] into the associative array stored as the corresponding element of list_summary_node_ names; e.g., if list_end_to_end_branches[i,2] is overlapped 100% by positions 5, 8, 9 and 12 of list_summary_branches[j], insert the process in the first position of list_end_to_end_branches[i,1] into the associative array stored as list_summary_nodes [array_summary_branches_node_map[j,5]]; insert the material in the second position of end_to_end_ branches_table[i,1] into the associative array associated with list_summary_nodes[array_summary_ branches_node_map[j,8]]; etc. These associative arrays permit a user who inspects the complete summary BFD to readily query a list of the unique material (or process) nodes represented by any of its blocks. One advantage of using associative arrays for the elements of list_summary_node_names (e.g., as opposed to lists) is that they automatically reject attempts to create redundant copies of the same keys.
  iii. For each edge connecting each gapped pair of parent and child nodes of list_end_to_end_branches[i,2], attempt to insert the corresponding edge into aa_summary_edges; e.g., attempt to insert as a key value the string constructed by concatenating array_ summary_branches_node_map[j,5], "-" and array_ summary_branches_node_map[j,8]. This step is beneficial because even though there exists a gapped configuration where the nodes of list_end_to_end_ branches[i] overlap 100% with all the nodes of list_summary_branches[j], one or more of its gap-associated edges may be distinct from all of the edges that have thus far been catalogued within aa_summary_edges.
 b) If the determination at Step 7 is no (no appropriate configuration exists) for element i of list_end_to_end_ branches, consider the example illustrated in FIG. 17, in which underlined letters correspond to process types, and italicized letters correspond to material_types. As illustrated in FIG. 17, a reference ordered sequence is constructed with list_summary_branches[min{j}], and an iterative calculation is performed on the given ordered sequence list_end_to_end_branches[i,2].
  i. Use the values of overlap calculated in the manner illustrated above to determine which element, j, of list_summary_branches maximizes overlap with list_end_to_end_branches [i,2]'s specific sequence of material_types and process_types. If the same maximum value of overlap has been calculated for more than one element, j, of list_summary_branches, select the element of list_summary_branches corresponding to the minimum value of j, min{j}. If the same maximum value of overlap with list_summary_branches[min{j}] has been calculated for more than one gapless or gapped configuration of list_end_ to_end_branches [i,2], select the configuration whose overlap was calculated first.

ii. For each material type or process type that is contributing positively to the calculation of maximum overlap (e.g., types E, H or L in the previous illustration), insert its material or process into the associative array stored as the corresponding element of list_summary_node_names. For example, if list_end_to_end_branches[i,2] is overlapped at positions 5, 8 and 12 of list_summary_branches[min{j}], insert the process in the first position of list_end_to_end_branches[i,1] into the associative array stored as list_summary_nodes[array_summary_branches_node_map[min{j},5]], insert the material in the second position of end_to_end_branches_table[i,1] into the associative array associated with list_summary_nodes[array_summary_branches_node_map[min{j},8]], etc.

iii. If N material_types (or process_types) are not contributing positively to the calculation of maximum overlap, add them in order as N new elements of list_summary_nodes; also add N associative arrays as N new elements of list_summary_node_names and insert in order the corresponding material and process names as their first key values.

iv. If list_summary_branches currently has P elements, add list_end_to_end_branches[i,2] as the (P+1)th element of list_summary_branches.

v. Add a new row to array_summary_branches_node_map and set its values accordingly: for example, array_summary_branches_node_map[P+1,1]=array_summary_branches_node_map[min {j},1] if there is positive overlap between the most upstream process type of list_end_to_end_branches[i,2] and the most upstream process type of list_summary_branches[min{j}]. If there is no overlap between the downstream material type in the, for example, 14th and final position of list_end_to_end_branches[i,2] and any material type of list_summary_branches[min{j}], then array_summary_ branches_node_map[P+1,14]=count(list_summary_nodes).

vi. For each edge connecting each non-overlapping or gapped pair of parent and child records of list_end_to_end_branches[i,2], attempt to insert the corresponding edge into aa_summary_edges. For example, attempt to insert as a key value the string constructed by concatenating array_summary_branches_node_map [P+1,13], "-" and array_summary_branches_node_map[P+1,14].

Step 8. Once Step 7 has been completed for every row i of end_to_end_branches_table, the following conditions should be met such that the summary BFD can be generated:

a) Each element of list_summary_edges is a unique edge in the summary BFD.

b) Each element, i, of list_summary_nodes is a unique block in the summary BFD.

The number of unique materials stored as the keys of the associative arrays stored as each element of list_summary_node_names is the count of each of these summary blocks.

In some example implementations, the summary BFDs are generated on a system in conjunction with a data input platform as described above. The summary BFDs may be generated, visualized, saved, used in some other manner, or any combination thereof on the data input platform.

Figure 18:
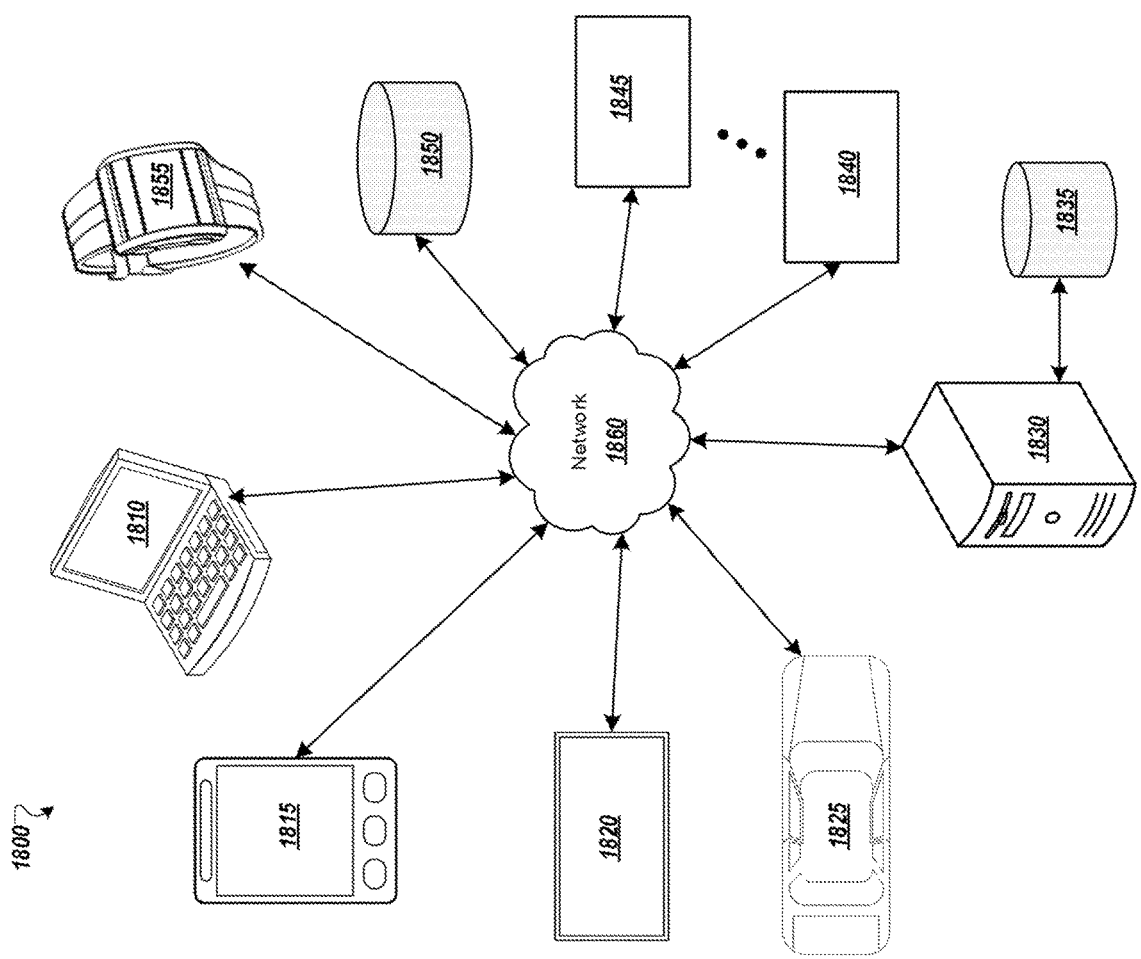
FIG. 18 illustrates an example environment according to an example implementation of the present application.

FIG. 18 shows an example environment suitable for some example implementations. Environment 1800 includes devices 1810-1855, and each is communicatively connected to at least one other device via, for example, network 1860 (e.g., by wired and/or wireless connections). Some devices may be communicatively connected to one or more storage devices 1840 and 1845.

Figure 19:
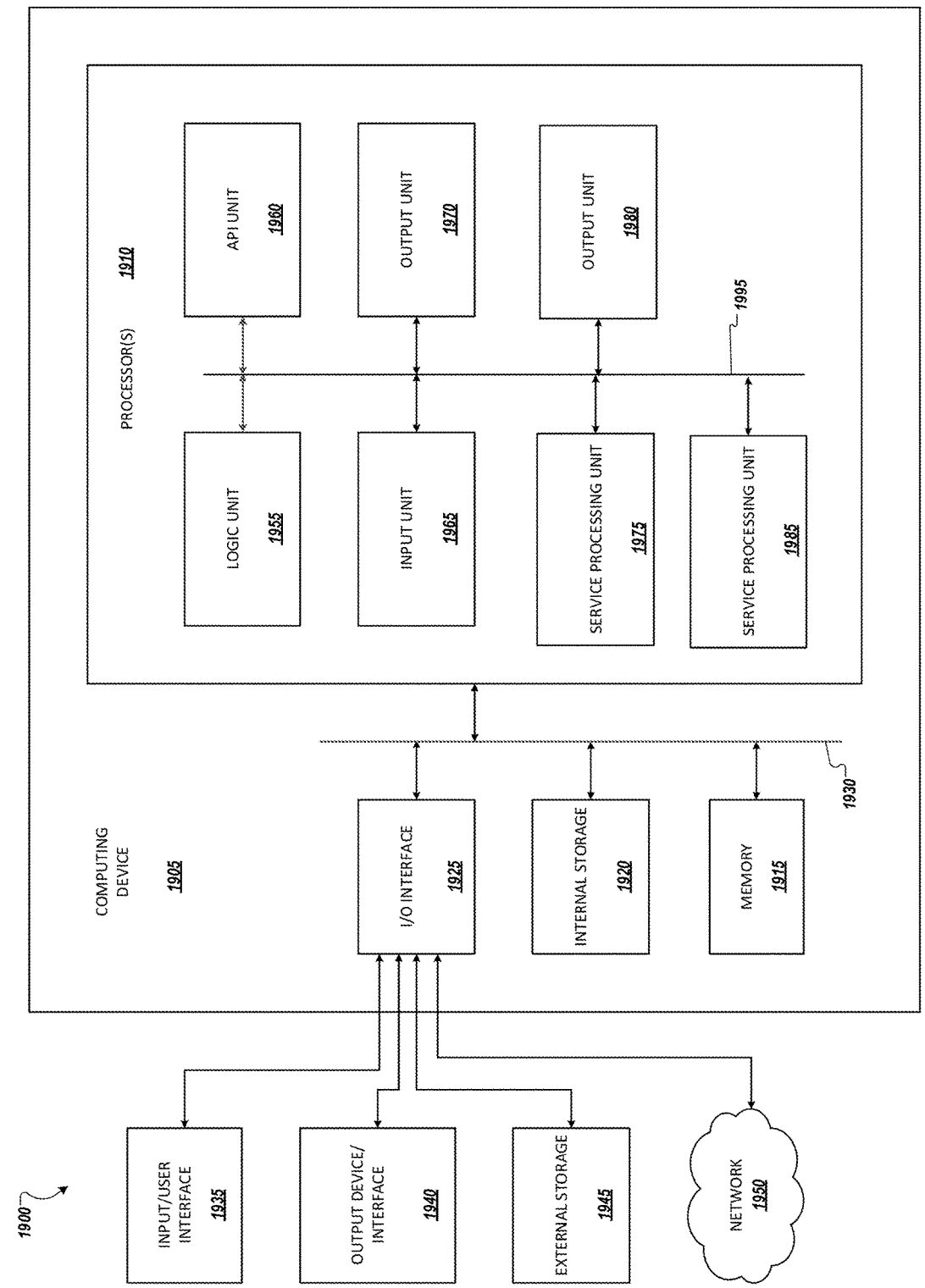
FIG. 19 illustrates an example computing environment with an example computer device suitable for use in some example implementations.

An example of one or more devices 1810-1855 may be computing devices 1900 described in FIG. 19, respectively. Devices 1805-1855 may include, but are not limited to, a computer 1810 (e.g., a laptop computing device) having a monitor, a mobile device 1815 (e.g., smartphone or tablet), a television 1820, a device associated with a vehicle 1825, a server computer 1830, computing devices 1835 and 1850, storage devices 1840 and 1845, and smart watch or other smart device 1855.

In some implementations, devices 1810-1825 and 1855 may be considered user devices associated with the users of the enterprise. Devices 1830-1850 may be devices associated with service providers (e.g., used by the external host to provide services as described above and with respect to the collecting and storing data).

The above-disclosed hardware implementations may be used in the environment of FIG. 18, as would be understood by those skilled in the art. For example, but not by way of limitation, and as explained above, some of the Wi-Fi enabled devices will be mobile, such as a smart phone 1815 or a wearable 1855. On the other hand, some devices may not be mobile, or may be intended to be excluded based on their device type, such as a desktop computer 1830 or a laptop 1810. Further, the cloud server (e.g., computing device 1850) explained above may be accessed via the network 1860.

Further, some of the locations may be specific to an environment such as a mobile or non-mobile laboratory, for example, as explained above. This may be represented as element 1825, for example.

FIG. 19 shows an example computing environment with an example computing device suitable for implementing at least one example embodiment. Computing device 1905 in computing environment 1900 can include one or more processing units, cores, or processors 1910, memory 1915 (e.g., RAM, ROM, and/or the like), internal storage 1920 (e.g., magnetic, optical, solid state storage, and/or organic), and I/O interface 1925, all of which can be coupled on a communication mechanism or bus 1930 for communicating information. Processors 1910 can be general purpose processors (CPUs) and/or special purpose processors (e.g., digital signal processors (DSPs), graphics processing units (GPUs), and others).

In some example embodiments, computing environment 1900 may include one or more devices used as analog-to-digital converters, digital-to-analog converters, and/or radio frequency handlers.

Computing device 1905 can be communicatively coupled to input/user interface 1935 and output device/interface 1940. Either one or both of input/user interface 1935 and output device/interface 1940 can be wired or wireless interface and can be detachable. Input/user interface 1935 may include any device, component, sensor, or interface, physical or virtual, which can be used to provide input (e.g., keyboard, a pointing/cursor control, microphone, camera, Braille, motion sensor, optical reader, and/or the like). Output device/interface 1940 may include a display, monitor, printer, speaker, Braille, or the like. In some example embodiments, input/user interface 1935 and output device/interface 1940 can be embedded with or physically coupled to computing device 1905 (e.g., a mobile computing device with buttons or touch-screen input/user interface and an output or printing display, or a television).

Computing device 1905 can be communicatively coupled to external storage 1945 and network 1950 for communicating with any number of networked components, devices, and systems, including one or more computing devices of the same or different configuration. Computing device 1905 or any connected computing device can be functioning as, providing services of, or referred to as a server, client, thin server, general machine, special-purpose machine, or another label.

I/O interface 1925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1900. Network 1950 can be any network or combination of networks (e.g., the Internet, local area network, wide area network, a telephonic network, a cellular network, satellite network, and the like).

Computing device 1905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1905 can be used to implement techniques, methods, applications, processes, or computer-executable instructions to implement at least one embodiment (e.g., a described embodiment). Computer-executable instructions can be retrieved from transitory media, and stored on and retrieved from non-transitory media. The executable instructions can be originated from one or more of any programming, scripting, and machine languages (e.g., C, C++, C #, Java, Visual Basic, Python, Perl, JavaScript, and others).

Processor(s) 1910 can execute under any operating system (OS) (not shown), in a native or virtual environment. To implement a described embodiment, one or more applications can be deployed that include logic unit 1955, application programming interface (API) unit 1960, input unit 1965, output units 1970 and 1980, service processing units 1975, 1985, and inter-unit communication mechanism 1995 for the different units to communicate with each other, with the OS, and with other applications (not shown).

For example, first service processing unit 1975 may perform the operations associated with the data input platform, and provide an output by the first output unit 1970. Second service processing unit 1985 may perform the operations associated the differential graph representations and provide an output by the second output unit 1980, The described units and elements can be varied in design, function, configuration, or implementation and are not limited to the descriptions provided.

In some example embodiments, when information or an execution instruction is received by API unit 1960, it may be communicated to one or more other units (e.g., logic unit 1955, input unit 1965, output units 1970 and 1980, service processing units 1975 and 1985). For example, input unit 1965 may use API unit 1960 to connect with other data sources so that the service processing units 1975 and 1985 can process the information.

In some examples, logic unit 1960 may be configured to control the information flow among the units and direct the services provided by API unit 1960, input unit 1965, output units 1970 and 1980, and service processing units 1975 and 1985 in order to implement an embodiment described above.

The description of implementations of the system is not intended to be exhaustive or to limit the system to the precise form disclosed below. While specific implementations of, and examples for, the system are described below for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, and/or blocks are presented in a given order, alternative implementations may perform routines having blocks, or employ systems having blocks, in a different order, and some processes or blocks may be deleted, moved, added, subdivided, combined, and/or modified to provide alternative or subcombinations. Each of these processes, message/data flows, and/or blocks may be implemented in a variety of different ways. Also, while processes and/or blocks are at times shown as being performed in series, these processes or blocks may instead be performed in parallel, and/or may be performed at different times. Further, any specific numbers noted herein are only examples: alternative implementations may employ differing values and/or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and systems provided herein can be applied to other systems, not necessarily the system described above. The elements, blocks and acts of the various implementations described above can be combined to provide further implementations.

Any patents and applications and other references noted above, including any that may be listed in accompanying filing papers, are incorporated herein by reference. To the extent any materials incorporated herein by reference conflict with the present disclosure, the present disclosure controls. Aspects of the technology can be modified, if necessary, to employ the systems, functions, and concepts of the various references described above to provide yet further implementations of the technology.

From the foregoing, it will be appreciated that specific example implementations of the disclosed technology have been described herein for purposes of illustration, but that various modifications may be made without deviating from the technology. Certain aspects of the technology described in the context of particular example implementations may be combined or eliminated in other example implementations. Further, while advantages associated with certain example implementations of the disclosed technology have been described in the context of those example implementations, other example implementations may also exhibit such advantages, and not all example implementations need necessarily exhibit such advantages to fall within the scope of the technology. Accordingly, the disclosure and associated technology can encompass other example implementations not expressly shown or described herein.

We claim:

1. A method of processing data, comprising:
receiving, at a processor, first data comprising a plurality of values;
receiving one or more directives;
retrieving a first set of records from the first data using a first subset of the one or more directives;
generating a second set of records based on the one or more directives using a second subset of the one or more directives;
generating, based on a third subset of the one or more directives, a plurality of record associations, the plurality of record associations including one or more of:
first relationships between records of the first set of records,
second relationships between records of the second set of records, and
third relationships between records of the first set of records and the second set of records;
storing the plurality of record associations in a structured format;
generating feedback data based on the plurality of record associations;
generating a third set of records by editing records of the first set of records using a fourth subset of the one or more directives;
editing one or more record associations of the plurality of record associations including the first relationships, the second relationships, the third relationships and fourth relationships between records of the first set of records, the second set of records, and the third set of records;
annotating a subset of the first data associated with the second set of records and the third set of records; and
annotating a subset of the first data associated with one or more of the first relationships, the second relationships, the third relationships, and the fourth relationships.

2. The method of claim 1, further comprising:
templating capture of the first data by applying the one or more directives to different values of the first data.

3. The method of claim 2, wherein the plurality of values of the first data include one or more of:
first values corresponding to physical materials,
second values corresponding to processes which take the physical materials as inputs or create the physical materials as outputs, and
third values corresponding to types of the physical materials, the processes, or measurements associated with at least one of the first values and the second values.

4. The method of claim 1, wherein generating the plurality of record associations further includes:
identifying first errors between the records of the first set of records,
identifying second errors between the records of the second set of records, and
identifying third errors between the records of the first set of records and the second set of records.

5. The method of claim 4, further comprising:
presenting, via a user interface, a feedback document based on one or more of the plurality of record associations and errors associated with generating the plurality of record associations.

6. The method of claim 1, further comprising:
generating a summary block flow diagram comprising a simplified graph which represents a primary graph, based at least in part on the plurality of record associations, wherein generating the summary block flow diagram comprises:
identifying primary objects associated with the first data;
determining graphical associations between the primary objects;
generating, based on the primary objects and the graphical associations, blocks data, wherein the blocks data represents one or more block objects based on common characteristics of one or more primary objects; and
via a user interface, displaying the simplified graph based in part on the primary objects, the graphical associations, and the blocks data, wherein the simplified graph has at least one representation that reflects the number of nodes, the number of edges and the connectivity between the nodes and the edges associated with the primary graph.

7. The method of claim 6, wherein, the at least one representation comprises two or more different representations that reflect the number of nodes, the number of edges and the connectivity between the nodes and the edges associated with the primary graph.

8. The method of claim 6, wherein the primary objects represent one or more of physical materials and processes that are used to at least one of process input materials and create output materials.

9. The method of claim 8, wherein, via a user interface, a graph is displayed based in part on the primary objects, the graphical associations, and the blocks data.

10. The method of claim 6, wherein the blocks data comprises a directed graph, wherein an association between a first primary object and a second primary object form an ordered pair.

11. The method of claim 10, wherein, via a user interface, a graph is displayed based in part on the primary objects, the graphical associations, and the blocks data.

12. The method of claim 8, wherein an association between physical materials and processes form a k-partite graph, wherein edges of the k-partite graph include a set of edges comprising associations between a first set of primary objects types to a second set of primary objects types, without overlap between the first set of primary objects types and the second set of primary objects types.

13. The method of claim 12, wherein, via a user interface, a graph is displayed based in part on the primary objects, the graphical associations, and the blocks data.

14. The method of claim 6, wherein associations between a first set of primary object types and a second set of primary object types form a k-partite graph, wherein edges of the k-partite graph include a set of edges comprising associations between a first set of primary object types and a second set of primary objects types, without overlap between the first set of primary objects types and the second set of primary objects types.

15. The method of claim 14, wherein, via a user interface, a graph is displayed based in part on the primary objects, the graphical associations, and the blocks data.

16. The method of claim 6, wherein associations between a first set of primary object types and a second set of primary object types form a directed k-partite graph, wherein edges of the directed k-partite graph include a set of edges comprising one or more of:
first type-to-second type associations, wherein an instance of the first type of primary object is designated an input to an instance of the second type of primary object, second type-to-first type associations, wherein the first type of primary object is designated an output of an instance of the second type of primary object, first type-to-first type associations, wherein a first instance of the first type of primary object is designated an input to a first instance of the second type of primary object and a second instance of the first type of primary object is designated an output of the first instance of the second type of primary object, and second type-to-second type associations, wherein a first instance of the second type of primary object is designated an input to a first instance of the first type of primary object and a second instance of the second type of primary object is designated an output of the first instance of the first type of primary object.

17. The method of claim 16, wherein, via a user interface, a graph is displayed based in part on the primary objects, the graphical associations, and the blocks data.

18. The method of claim 8, wherein an association between physical materials and processes form a directed k-partite graph, wherein edges of the directed k-partite graph include a set of edges comprising one or more of:

material-to-process associations, wherein a physical material is designated an input material to a child process, process-to-material associations, wherein the physical material is designated an output material of a parent process, material-to-material associations, wherein a first physical material is designated the input material to a first process and a second physical material is designated the output material of the first process, and process-to-process associations, wherein the first process is designated the parent process to the physical material and a second process is designated the child process to the physical material.

19. The method of claim 18, wherein, via a user interface, a graph is displayed based in part on the primary objects, the graphical associations, and the blocks data.

20. A non-transitory computer-readable medium storing computer executable code that, when executed, causes a processor to:

receive first data comprising a plurality of values;

receive one or more directives;

retrieve a first set of records from the first data using a first subset of the one or more directives;

generate a second set of records based on the one or more directives using a second subset of the one or more second directives;

generate, based on a third subset of the one or more directives, a plurality of record associations, the plurality of record associations including one or more of:

first relationships between records of the first set of records, second relationships between records of the second set of records, and third relationships between records of the first set of records and the second set of records;

store the plurality of record associations in a structured format;

generate feedback data based on the plurality of record associations;

generate a third set of records by editing records of the first set of records using a fourth subset of the one or more directives;

edit one or more record associations of the plurality of record associations including the first relationships, the second relationships, the third relationships and fourth relationships between records of the first set of records, the second set of records, and the third set of records;

annotating a subset of the first data associated with the second set of records and the third set of records; and annotating a subset of the first data associated with one or more of the first relationships, the second relationships, the third relationships, and the fourth relationships.

21. The non-transitory computer-readable medium of claim 20, wherein the computer executable code, when executed, further causes the processor to:

templating capture of the first data by applying the one or more directives to different values of the first data.

22. A method of processing data, comprising:

generating a summary block flow diagram comprising a simplified graph which represents a primary graph, based at least in part on a plurality of record associations, wherein generating the summary block flow diagram comprises:

identifying primary objects associated with first data including a plurality of values;

determining graphical associations between the primary objects; and generating, based on the primary objects and the graphical associations, blocks data, wherein the blocks data represents one or more block objects based on common characteristics of one or more primary objects; and via a user interface, displaying the simplified graph based in part on the primary objects, the graphical associations, and the blocks data, wherein the simplified graph has at least one representation that reflects the number of nodes, the number of edges and the connectivity between the nodes and the edges associated with the primary graph.

23. The method of claim 22, wherein, via a user interface, the at least one representation comprises two or more different representations that reflect the number of nodes, the number of edges and the connectivity between the nodes and the edges associated with the primary graph.

24. The method of claim 22, wherein the primary objects represent one or more of physical materials and processes that are used to at least one of process input materials and create output materials.

25. The method of claim 24, wherein, via a user interface, a graph is displayed based in part on the primary objects, the graphical associations, and the blocks data.

26. The method of claim 22, wherein the blocks data comprises a directed graph, wherein an association between a first primary object and a second primary object form an ordered pair.

27. The method of claim 26, wherein, via a user interface, a graph is displayed based in part on the primary objects, the graphical associations, and the blocks data.

28. The method of claim 24, wherein an association between physical materials and processes form a k-partite graph, wherein edges of the k-partite graph include a set of edges comprising associations between a first set of primary objects types to a second set of primary objects types, without overlap between the first set of primary objects types and the second set of primary objects types.

29. The method of claim 28, wherein, via a user interface, a graph is displayed based in part on the primary objects, the graphical associations, and the blocks data.

30. The method of claim 22, wherein associations between a first set of primary object types and a second set of primary object types form a k-partite graph, wherein edges of the k-partite graph include a set of edges comprising associations between a first set of primary objects types and a second set of primary objects types, without overlap between the first set of primary objects types and the second set of primary objects types.

31. The method of claim 30, wherein, via a user interface, a graph is displayed based in part on the primary objects, the graphical associations, and the blocks data.

32. The method of claim 22, wherein associations between a first set of primary object types and a second set of primary object types form a directed k-partite graph, wherein edges of the directed k-partite graph include a set of edges comprising one or more of:
   first type-to-second type associations, wherein an instance of the first type of primary object is designated an input to an instance of the second type of primary object,
   second type-to-first type associations, wherein the first type of primary object is designated an output of an instance of the second type of primary object,
   first type-to-first type associations, wherein a first instance of the first type of primary object is designated an input to a first instance of the second type of primary object and a second instance of the first type of primary object is designated an output of the first instance of the second type of primary object, and
   second type-to-second type associations, wherein a first instance of the second type of primary object is designated an input to a first instance of the first type of primary object and a second instance of the second type of primary object is designated an output of the first instance of the first type of primary object.

33. The method of claim 30, wherein, via a user interface, a graph is displayed based in part on the primary objects, the graphical associations, and the blocks data.

34. The method of claim 24, wherein an association between physical materials and processes form a directed k-partite graph, wherein edges of the directed k-partite graph include a set of edges comprising one or more of:
   material-to-process associations, wherein a physical material is designated an input material to a child process,
   process-to-material associations, wherein the physical material is designated an output material of a parent process,
   material-to-material associations, wherein a first physical material is designated the input material to a first process and a second physical material is designated the output material of the first process, and
   process-to-process associations, wherein the first process is designated the parent process to the physical material and a second process is designated the child process to the physical material.

35. The method of claim 34, wherein, via a user interface, a graph is displayed based in part on the primary objects, the graphical associations, and the blocks data.

36. The method of claim 34, wherein a value of k in the k-partite graph is two.

* * * * *